United States Patent
Aoki et al.

(10) Patent No.: US 7,428,280 B2
(45) Date of Patent: Sep. 23, 2008

(54) RECEIVING APPARATUS AND TRANSCEIVER

(75) Inventors: Tsuguhide Aoki, Kanagawa-Ken (JP); Shuichi Obayashi, Fort Lee, NJ (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/766,576

(22) Filed: Jun. 21, 2007

(65) Prior Publication Data
US 2007/0248200 A1   Oct. 25, 2007

Related U.S. Application Data

(63) Continuation of application No. 10/385,666, filed on Mar. 12, 2003, now Pat. No. 7,245,679.

(30) Foreign Application Priority Data
Mar. 12, 2002   (JP) ............................... 2002-67191

(51) Int. Cl.
  *H04B 1/10* (2006.01)
(52) U.S. Cl. .................. 375/349; 375/346; 375/347; 375/340; 375/341; 329/318; 329/319; 329/320; 455/501
(58) Field of Classification Search ......... 375/340–341, 375/346–350; 455/501; 329/318–320
See application file for complete search history.

(56) References Cited

U.S. PATENT DOCUMENTS

| 6,097,771 A | 8/2000 | Foschini |
| 6,151,328 A | 11/2000 | Kwon et al. |
| 6,452,981 B1 | 9/2002 | Raleigh et al. |
| 6,765,969 B1 | 7/2004 | Vook et al. |
| 6,917,820 B2 | 7/2005 | Gore et al. |
| 7,027,533 B2 | 4/2006 | Abe et al. |
| 2003/0053524 A1* | 3/2003 | Dent .......................... 375/148 |

OTHER PUBLICATIONS

Xiaodong Li, et al., "Reduced-Complexity Detection Algorithms For Systems Using Multi-Element Arrays", IEEE, pp. 1072-1076, vol. 2, 2000.

* cited by examiner

*Primary Examiner*—Curtis B Odom
(74) *Attorney, Agent, or Firm*—Oblon, Spivak, McClelland, Maier & Neustadt, P.C.

(57) ABSTRACT

The present invention has a N pieces of receiving antennas, a propagation path characterization estimator, a weight generator for interference canceller, an array processing interference canceller, a weight generator for signal estimator, a signal estimator, a transmission signal classification apparatus, and a decoding order decision apparatus. The antenna inference elimination circuit eliminates only signal component relating to transmission signal component which does not belong to groups. The signal estimator performs separation and decoding of the transmission signal belonging to the group. The transmission signal classification apparatus classifies the transmission signals from sets of the transmission antennas in which a cross-correlation value of the vector is larger than a threshold value, into one group, and classifies the transmission signal in which the cross-correlation value is smaller than the threshold value, into another group.

4 Claims, 16 Drawing Sheets

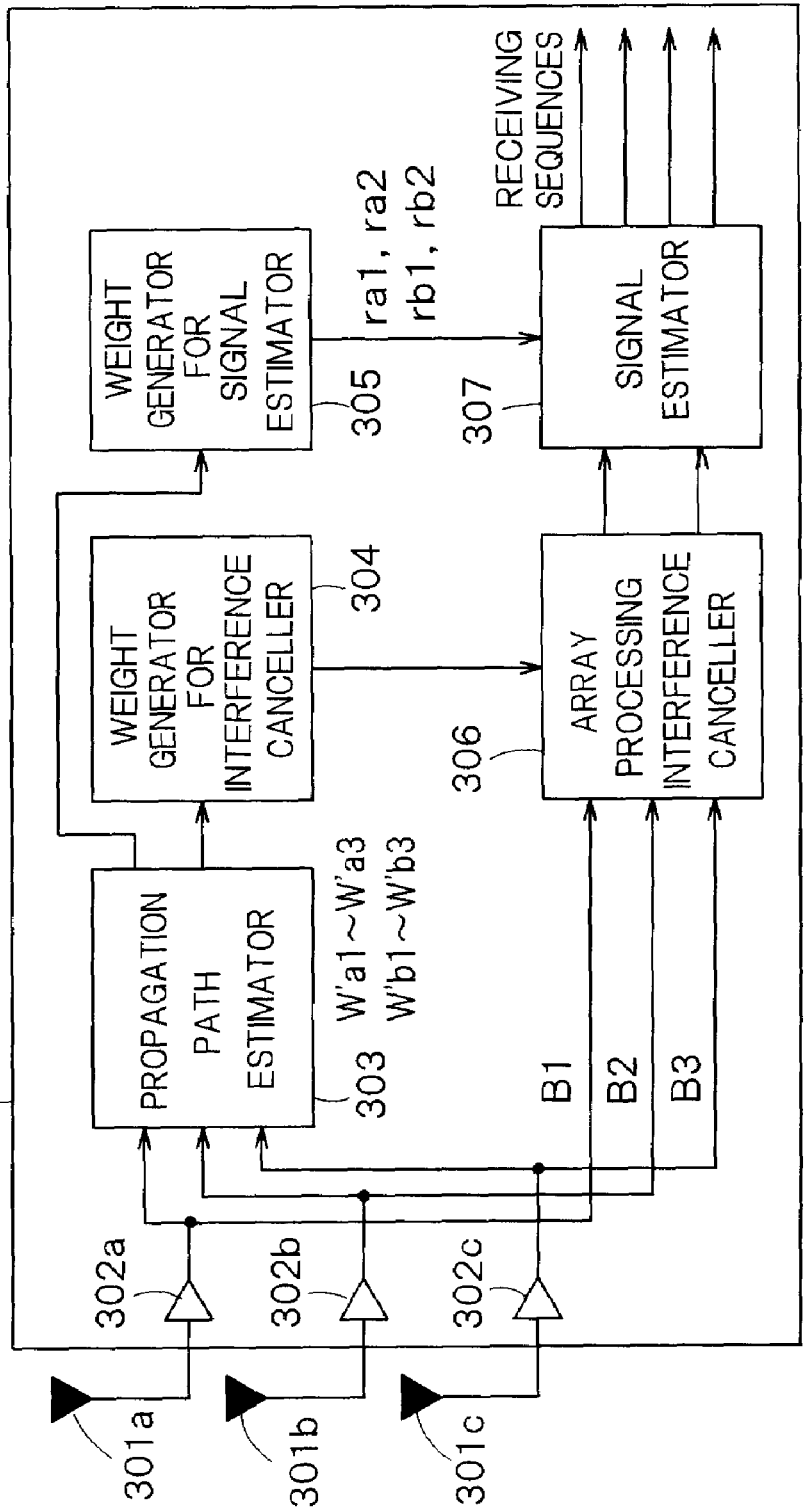
F I G. 1

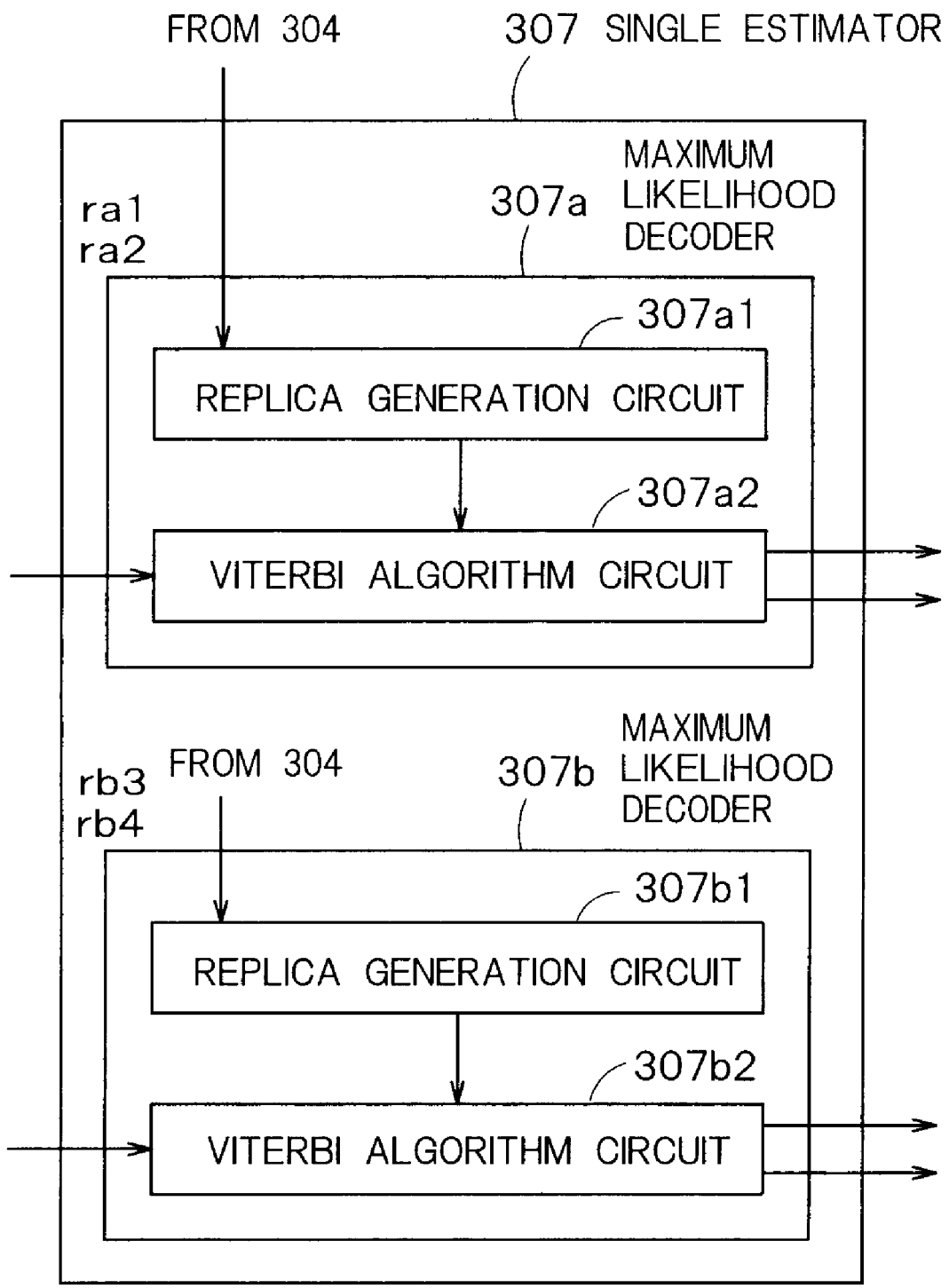
F I G. 4

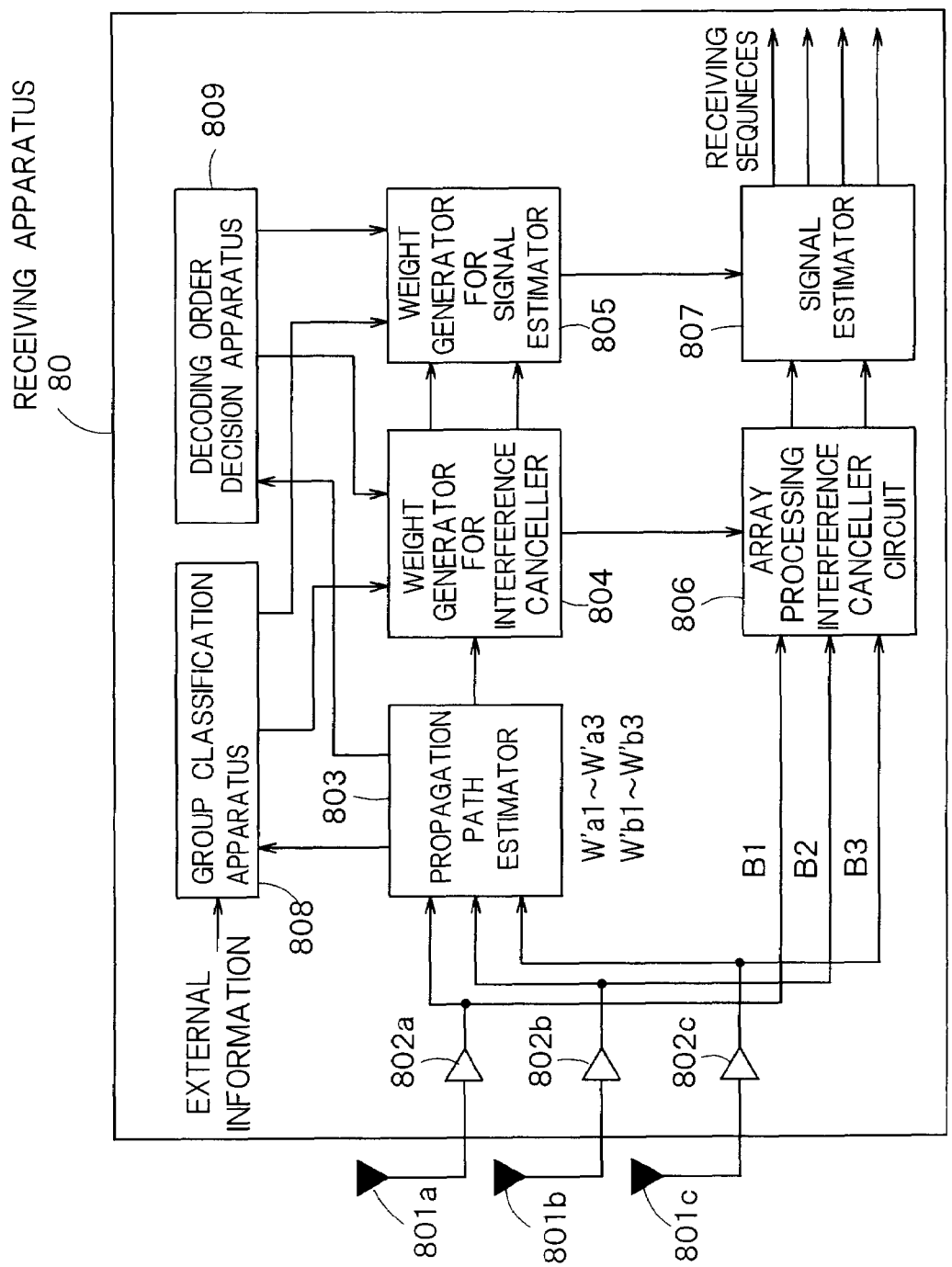
F I G. 5

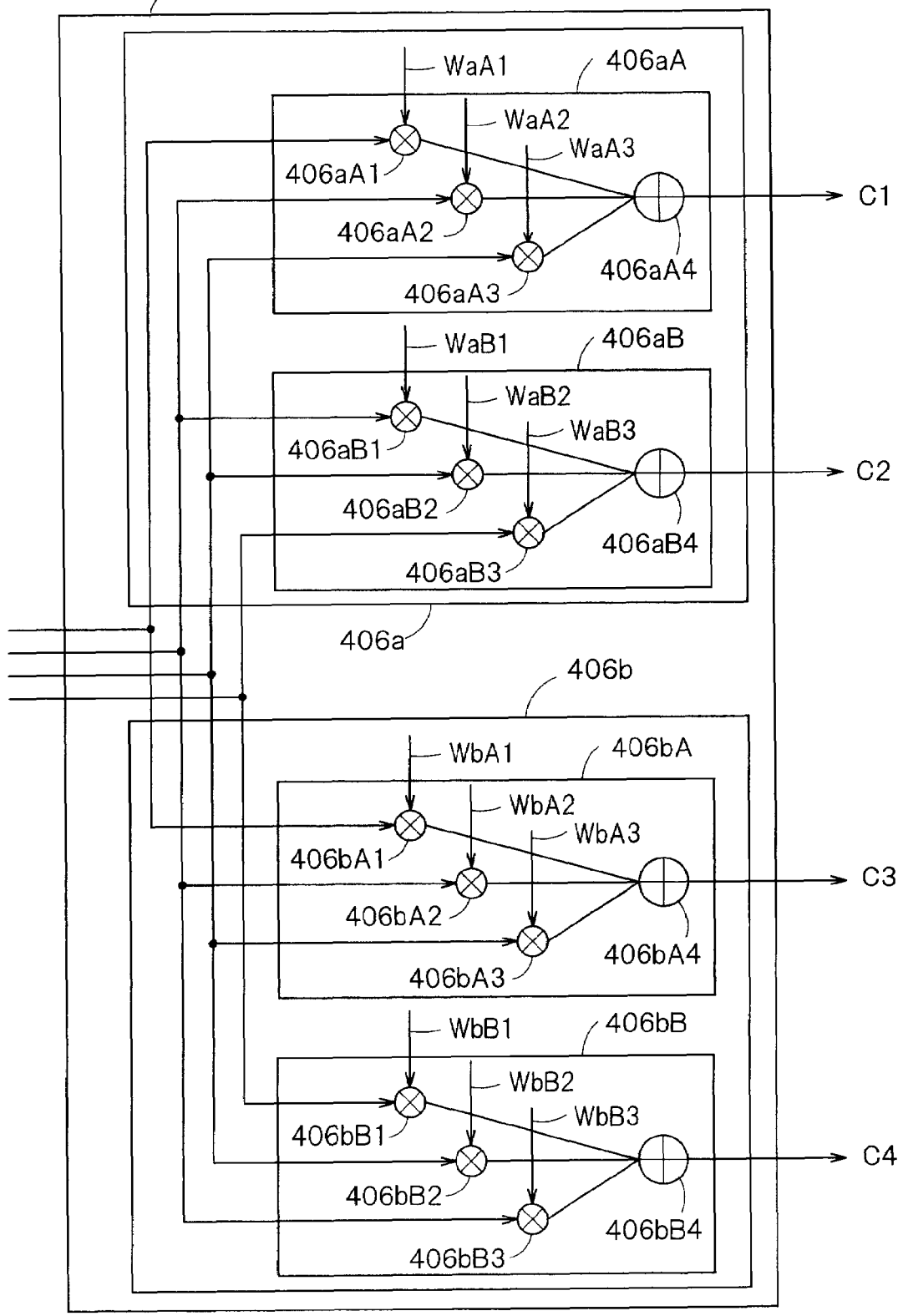
F I G. 8

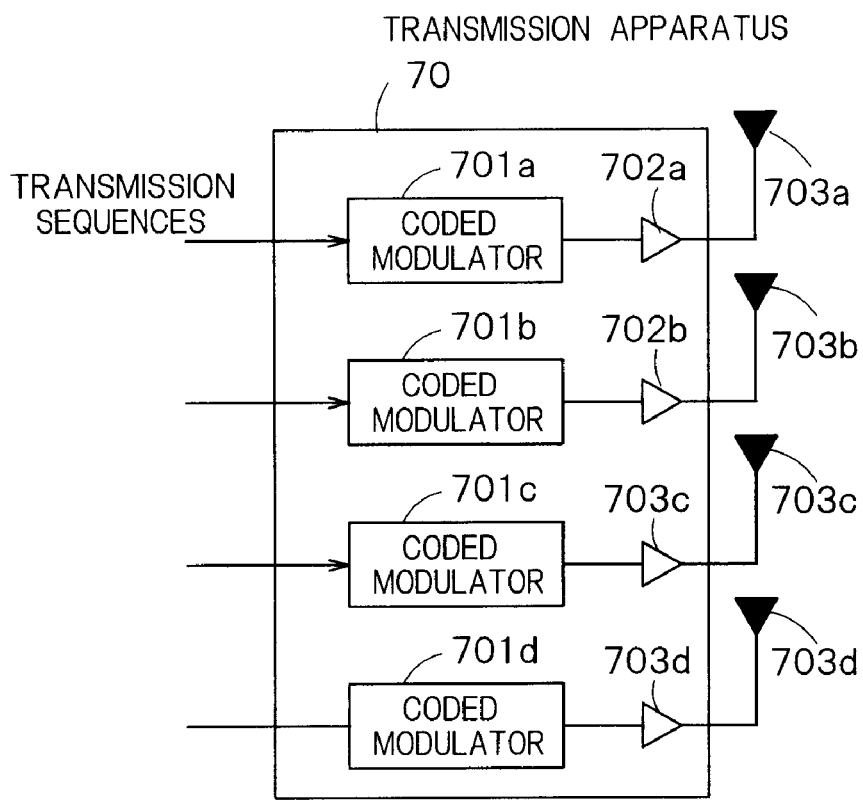
F I G. 12
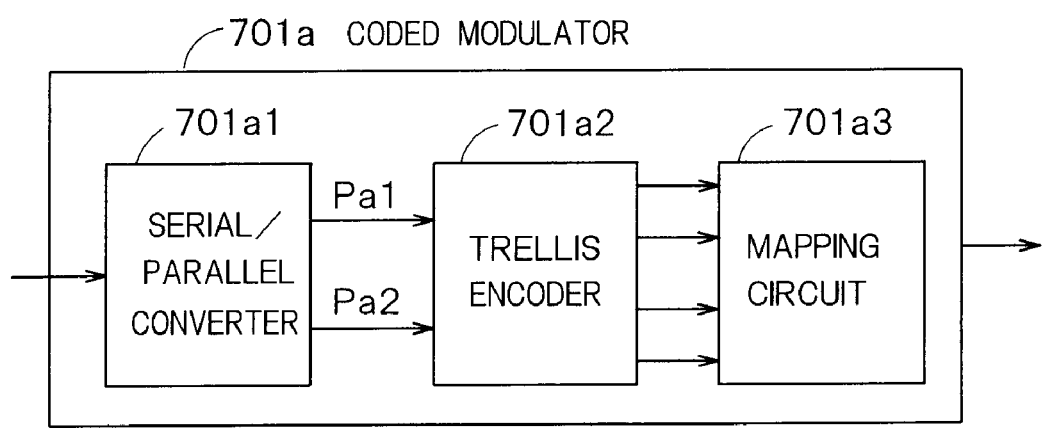
F I G. 13

FIG. 15

| TRELLIS ENCODER 701a2 | | | | |
|---|---|---|---|---|
| STATES | OUTPUT | | | |
| | 00 | 01 | 10 | 11 |
| 00 | 0 | 4 | 8 | 12 |
| 01 | 13 | 9 | 5 | 1 |
| 10 | 15 | 11 | 7 | 3 |
| 11 | 2 | 6 | 10 | 14 |

| TRELLIS ENCODER 701b2 | | | | |
|---|---|---|---|---|
| STATES | OUTPUT | | | |
| | 00 | 01 | 10 | 11 |
| 00 | 0 | 4 | 12 | 8 |
| 01 | 1 | 5 | 13 | 9 |
| 10 | 3 | 7 | 15 | 11 |
| 11 | 2 | 6 | 14 | 10 |

| TRELLIS ENCODER 701c2 | | | | |
|---|---|---|---|---|
| STATES | OUTPUT | | | |
| | 00 | 01 | 10 | 11 |
| 00 | 0 | 4 | 8 | 12 |
| 01 | 5 | 9 | 1 | 13 |
| 10 | 3 | 7 | 15 | 11 |
| 11 | 6 | 2 | 10 | 14 |

| TRELLIS ENCODER 701d2 | | | | |
|---|---|---|---|---|
| STATES | OUTPUT | | | |
| | 00 | 01 | 10 | 11 |
| 00 | 0 | 4 | 11 | 13 |
| 01 | 15 | 9 | 7 | 1 |
| 10 | 2 | 6 | 10 | 14 |
| 11 | 12 | 8 | 5 | 3 |

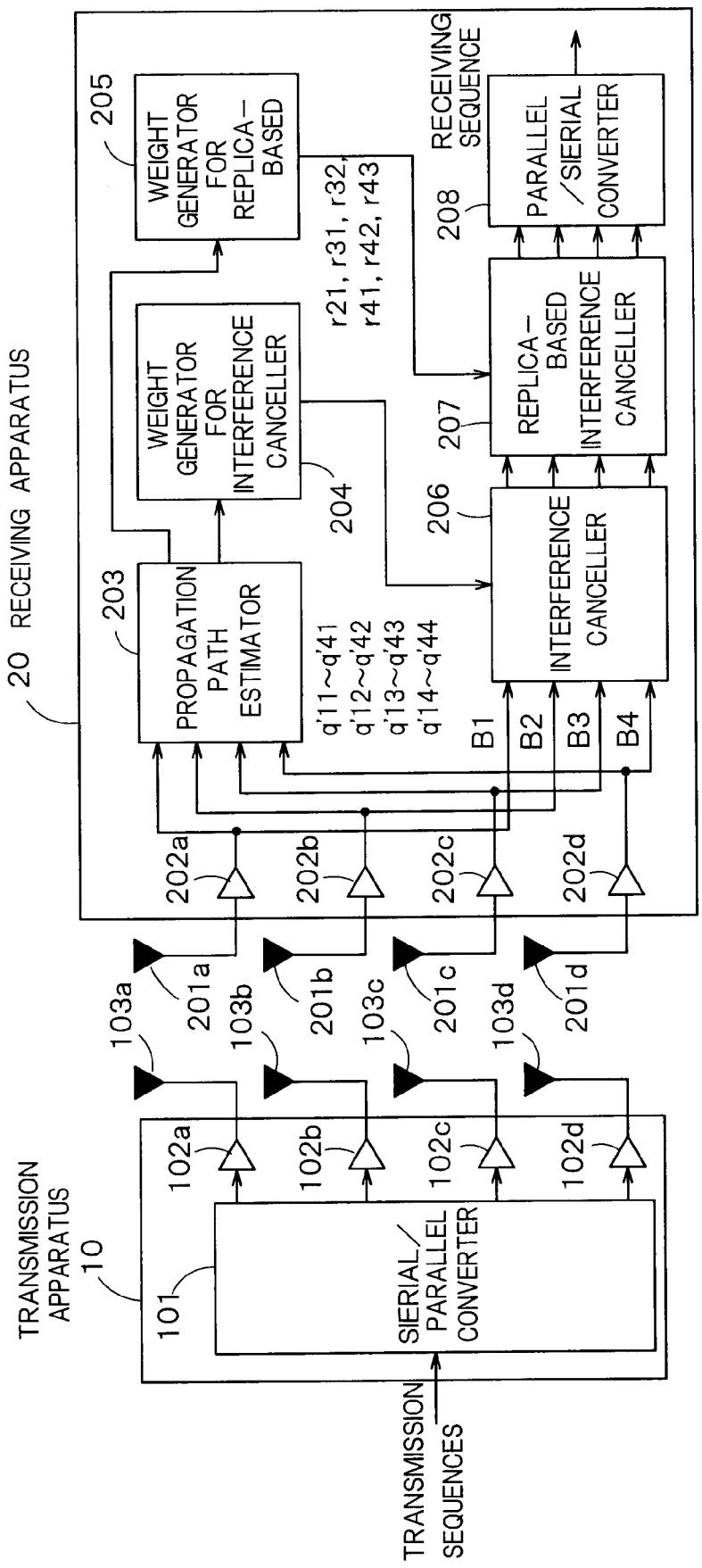
FIG. 17 (BLAST)

RECEIVING APPARATUS AND TRANSCEIVER

CROSS REFERENCE TO RELATED APPLICATIONS

This application is a Continuation application of, and claims the benefit of priority under 35 U.S.C. § 120 from, U.S. application Ser. No. 10/385,666, filed Mar. 12, 2003, which claims the benefit of priority under 35 U.S.C. § 119 from Japanese Patent Application No. 2002-67191, filed on Mar. 12, 2002. The entire contents of each of the above applications are incorporated herein by reference.

BACKGROUND OF THE INVENTION

1. Field of the Invention

The present invention relates to a receiving apparatus and a transceiver which receive superposition signals obtained by superposing a plurality of signals by a plurality of antennas and separate individual signals from the received signals.

2. Related Background Art

In a transmission apparatus of a wireless communication system, a technique in which different transmission symbols are transmitted from transmission antennas on the same resource (for example, on the same time and the same frequency) by using a plurality of transmission antennas and receiving antennas, and individual signals are separated from the superposition signals obtained by superposing a plurality of transmission symbols, in order to separate and estimate the individual signals. This is a technique for increasing capacity of transmission rate at larger amount than the wireless communication system using a single antenna. The technique is called MIMO (Multiple Input Multiple Output).

For example, G. J. Foshini has proposed in "Layered Space-time architecture for wireless communication in a fading environment when using multi-element antennas", Bell Labs Technical Journal, pp. 41-59, Autumn, 1998, a communication system which has plurality of antennas both at the transmitter and receiver. This is called BLAST (Bell Labs Layered Space-Time). The BLAST converts transmission symbols of serial data into parallel data, and then transmits different symbols with the same frequency from the transmission antennas at the same time. The receiving apparatus deals with the transmission symbols from the transmission antennas as interference, and eliminates interference and recover the individual symbols by using the antennas of more than the number of the antennas of the transmission apparatus. Because of this, in the BLAST, if characteristics of channel impulse response between the antennas, it is possible to obtain the capacity of M times (M is the number of the transmission antennas) of capacity of transmission rate by the conventional single antenna.

Incidentally, according to the conventional techniques (BLAST), weight vectors which are orthogonal to vectors constituted by the channel impulse response from the transmission antennas could be generated to eliminate the interference. The number of the required receiving antennas has to be the same as or more than the number of the transmission antennas. Because of this, in cellular system and so on, when the BLAST is used for down link from the wireless base station to the wireless terminal, there is a problem in which the number of the antennas of the wireless terminals increases and downsizing of the wireless terminal becomes difficult.

SUMMARY OF THE INVENTION

An object of the present invention is to provide a receiving apparatus and a transceiver capable of decreasing the number of the receiving antennas, improving error rate of the signals, or reducing power consumption.

According to the present invention, a receiving apparatus, comprising:

N ($N \geq 2$) pieces of receiving antennas;

a channel impulse response estimator which estimates characteristics of channel impulse response of said N pieces of receiving antennas based on L ($2 \leq L$) pieces of transmission signals transmitted from said L pieces of transmission antennas among M ($L \leq M$) pieces of transmission antennas;

a weight generator for interference canceller which calculates weight vectors to be multiplied by output signals of said N pieces of receiving antennas based on estimates of the characteristics of said channel impulse response;

an array processing interference canceller which eliminates signal components relating to I ($I \leq N-2$ in the case where said N is less than said L, and $I=L-2$ in the case where said N is not less than said L) pieces of transmission signals from superposition signals obtained by superposing said L pieces of transmission signals via each propagation path, and extracts superposition signals obtained by superposing the signal components relating to tow or more transmission signals by multiplying the output signals of said N pieces of receiving antennas by said weight vectors, and adding together the multiplied results;

a weight generator for signal estimator which calculates weights to be used to calculate estimates of the receiving signal included in the output of said array processing interference canceller;

a signal estimation circuit which separates and decodes individual transmission signals from the output signals of said array processing interference canceller, by using the weights calculated by said weight generator for signal estimator;

a transmission signal classification apparatus which classifies said L pieces of transmission signals into more than one groups each including one or more transmission signals; and a decoding order decision apparatus which decides the decoding order of said more than one groups, wherein said array processing interference canceller eliminates only the signal component relating to transmission signal component which does not belong to said group, based on the order of the decoding decided by said decoding order decision apparatus;

said signal estimation circuit separates and decodes the transmission signals in the group; and said transmission signal classification apparatus classifies into one group the transmission signals from sets of the transmission antennas in which cross-correlation value of the vector is larger than a threshold value, and classifies into another group the transmission signals in which the cross-correlation value is smaller than said threshold value, among L pieces of vectors which are factors of the channel impulse response between said L pieces of transmission antennas and said N pieces of receiving antennas.

Furthermore, according to the present invention, a receiving apparatus, comprising:

N ($N \geq 2$) pieces of receiving antennas;

a channel impulse response estimator which estimates characteristics of channel impulse response of said N pieces of receiving antennas, based on L ($2 \leq L$) pieces of transmission signals transmitted from said L pieces of transmission signals among M ($2 \leq L \leq M$) pieces of transmission antennas;

a weight generator for interference canceller which calculates weight vectors to be multiplied by output signals of sets consisted of two or more and less than N pieces of receiving antennas among said N pieces of receiving antennas, based on estimates of the characteristics of said channel impulse response;

an array processing interference canceller which eliminates signal components relating to I (I≦N−2 in the case where said N is less than said L, and I=L−2 in the case where said N is not less than said L) pieces of transmission signals from superposition signals obtained by superposing said L pieces of transmission signals via each propagation path, and outputs the superposition signals obtained by superposing signal components relating to two or more transmission signals from which signal components has not been eliminated, for the number of said sets, by multiplying the output signals of the receiving antennas belonging to said sets by said weight vectors, and adding together the multiplied results;

a weight generator for signal estimator which calculates weights to be used to calculate estimates of the receiving signal included in the output of said array processing interference canceller; and a signal estimation circuit which separates and decodes individual transmission signals from the output signals of said array processing interference canceller, by using the weights calculated by said weight generator for signal estimator.

BRIEF DESCRIPTION OF THE DRAWINGS

FIG. 1 is a block diagram showing schematic configuration of a receiving apparatus of a first embodiment according to the present invention.

FIG. 4 is a block diagram showing internal configuration of a signal estimator in the receiving apparatus of FIG. 1.

FIG. 5 is a block diagram showing a modified example of the receiving apparatus of FIG. 1.

FIG. 8 is a block diagram showing internal configuration of an antenna interference elimination apparatus in the receiving apparatus of FIG. 6.

FIG. 12 is a block diagram showing internal configuration of a receiving apparatus of a fifth embodiment according to the fifth embodiment.

FIG. 13 is a diagram showing configuration of a coding modulator of the fifth embodiment.

FIG. 15 is a diagram showing a chart of coding rule of the trellis coder of the fifth embodiment.

FIG. 17 is a diagram showing an example of a transmission apparatus.

DESCRIPTION OF THE PREFERRED EMBODIMENTS

Figure 2:
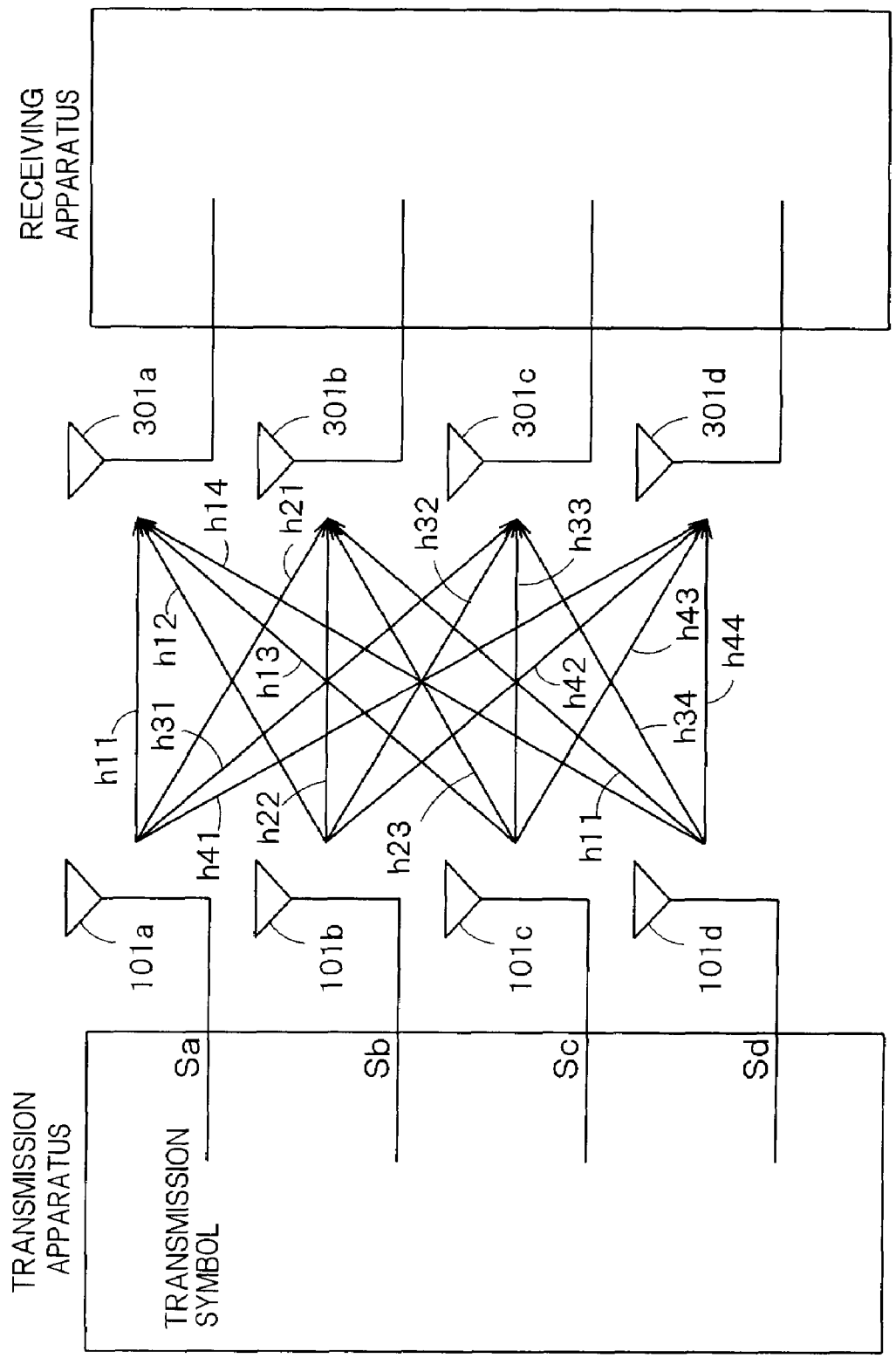
FIG. 2 is a diagram expressing transmission antennas, receiving antennas, channel impulse response and transmission symbols.

Hereinafter, one embodiment according to the present invention will be described with reference to drawings.

First Embodiment

FIG. 1 is a block diagram showing schematic configuration of a first embodiment of a receiving apparatus according to the present invention. The receiving apparatus 30 of FIG. 1 has a plurality of receiving antennas 301a, 301b and 301c, wireless receiving processing parts which perform prescribed wireless processings (such as A/D conversion or down conversion), a propagation path estimator 303, a weight generator for interference canceller 304, a weight generator for signal estimator 305, an array processing interference canceller 306, and a signal estimator 307.

Hereinafter, operation of the present invention will be explained with reference to FIG. 1. The receiving apparatus 30 of the present embodiment, for example, receives the transmission signals from the transmission apparatus shown in FIG. 17. In the receiving apparatus 30 of FIG. 1, the wireless receiving processing parts 302a, 302b and 302c perform prescribed wireless receiving processings for the signals received by the antennas 301a, 301b and 301c. First signals which has performed the prescribed wireless receiving processings are distributed to the propagation path estimation part 303 when the channel impulse response are estimated, in order to estimate the wireless channel impulse response from the transmission antennas to the receiving antennas. Next, the signals are transmitted to the array processing interference canceller using antenna array 306 when data is received. Channel impulse response vectors estimated by the channel impulse response estimator 303 are inputted to the weight generator for interference canceller 304 and the weight generator for signal estimator 305 corresponding to the respective antennas.

The weight generator for interference canceller 304 calculates weight vectors to be used by the array processing interference canceller 306. The weight generator for signal estimator 305 calculates weights to be used for the estimation of the receiving signals by the signal estimator 307. The outputs of the array processing interference canceller 306 are inputted to the signal estimator 307 to recover data sequence.

Figures 3A, 3B:
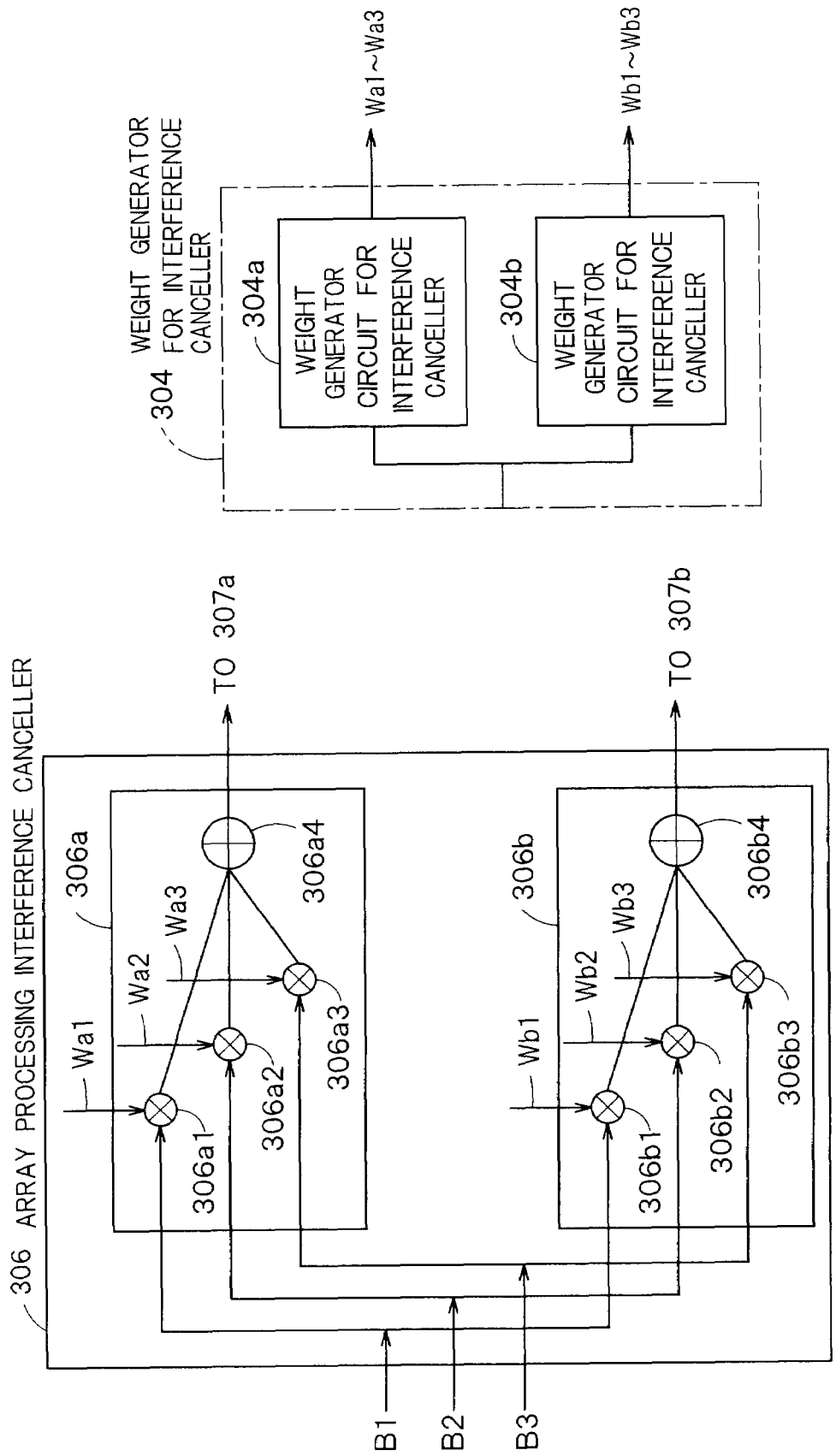
FIG. 3 is a block diagram showing internal configuration of an array processing interference canceller in the receiving apparatus of FIG. 1.

Hereinafter, the weight generator for interference canceller 304 will be explained in detail. FIG. 2 is a diagram showing a relationship of characteristics of the channel impulse response and the transmission symbols from the transmission antennas to the receiving antennas. FIG. 3A is a block diagram showing detailed configurations of the weight generator for interference canceller, and FIG. 3B is a block diagram showing detailed configurations of the array processing interference canceller.

The weight generator for interference canceller 304 has weight generator circuits for interference canceller 304a and 304b, as shown in FIG. 3A. The weight generator circuits for interference canceller calculates vectors (Wa1, Wa2, Wa3) for canceling the influence from transmission antennas 103c and 103d and extracting only the signals from which the signal group transmitted from the transmission antennas 103a and 103b is superposed. More specifically, a vector (Wa1, Wa2, Wa3) is orthogonal to two vectors (h13, h23, h33, h43) and (h14, h24, h34, h44). In this case, it is possible to calculate the vector by using QR decomposition or orthogonalization of Gran Schmidt. This calculation method is disclosed in "BLAST Training: Estimating channel characteristics for high capacity space-time wireless" by T. L. Marzetta et al.

Similarly, weight generator circuits for interference canceller calculates a vector (Wb1, Wb2, Wb3) for extracting only the signal from which the signal group transmitted from the transmission antennas 103c and 103d has been superposed.

Hereinafter, operation of the weight generator for signal estimator 305 will be explained. The weight generator for signal estimator 305 calculates the complex amplitude in the output of the array processing interference canceller 306a. This calculation is performed by multiplying the weight vector (Wa1, Wa2, Wa3) by left side of the channel impulse response matrix. Because the receiving apparatus of FIG. 1 has three pieces of receiving antennas, the propagation path matrix is expressed by Equation (1).

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \end{bmatrix} \quad (1)$$

Because of this, the weights ra1 and ra2 for calculating the estimates of the transmission signal component included in the output of the antenna interference elimination vector calculation circuit 304a can be calculated by Equation (2).

$$[Wa1 \ Wa2 \ Wa3] \cdot \begin{bmatrix} h_{11} & h_{12} & h_{13} & h_{14} \\ h_{21} & h_{22} & h_{23} & h_{24} \\ h_{31} & h_{32} & h_{33} & h_{34} \end{bmatrix} = [ra1 \ ra2 \ 0 \ 0] \quad (2)$$

As shown in Equation (5), the component corresponding to the transmission symbols Sc and Sd becomes zero. Similarly, the estimates rb1 and rb2 of the transmission signal component included in the output of the antenna interference elimination part 306b are calculated.

The array processing interference canceller 306 has antenna interference elimination parts 306a and 306b as shown in FIG. 3B. The antenna interference elimination part 306a has multipliers 306a1, 306a2 and 306a3 and an adder 306a4. Similarly, the antenna interference elimination part 306b has the multipliers 306b1, 306b2 and 306b3 and an adder 306b4. A signal to which prescribed wireless receiving processings are performed is distributed to the antenna interference elimination parts 306a and 306b.

In the antenna interference elimination part 306a, the multipliers 306a1, 306a2 and 306a3 multiplies by the weights Wa1, Wa2 and Wa3 calculated by the interference elimination vector calculation circuit 304a for each antenna, and the adder 306a4 adds together the multiplied results. Here, the weights Wa1, Wa2 and Wa3 are orthogonal to the above-mentioned vectors (h13, h23, h33) and (h14, h24, h34). Because of this, the signal relating to the transmission symbols Sc and Sd transmitted by the transmission antennas 103a and 103b is included in the output of the antenna interference elimination part 306a.

In the antenna interference elimination part 306b, the multipliers 306b1, 306b2 and 306b3 multiplies by the weight vector (Wb1, Wb2, Wb3) calculated by the interference elimination vector calculation circuit 304b, and the adder 306a4 adds together the multiplied results. Here, the weight vector (Wb1, Wb2, Wb3) is orthogonal to the above-mentioned vectors (h11, h21, h31) and (h12, h22, h32). Because of this, the signal relating to the transmission symbols Sa and Sb transmitted by the transmission antennas 103c and 103d is included in the output of the antenna interference elimination part 306b.

Thus, the array processing interference canceller 306 eliminates the signal component relating to I (I≦N−2 in the case where N is less than L, and I=L−2 in the case where N is not less than L) pieces of transmission signals from the superposition signals obtained by superposing L pieces of transmission signals via the channel impulse response, and extracts the superposition signals by superposing the signal components relating to two or more transmission signals from which signal components have not been eliminated, by multiplying the output signals of N (N≧2) pieces of receiving antennas by the weight vectors, and adding together the multiplied results.

Hereinafter, the signal estimator 307 will be explained. In the present embodiment, as an example of the signal estimator, an example using a maximum likelihood decoder will be explained. The signal estimator 307 has the maximum likelihood decoders 307a and 307b. Because the maximum likelihood decoders 307a and 307b has the same functions, only the maximum likelihood decoder 307a will be explained. The maximum likelihood decoders 307a has a replica generation circuit 307a1 and the viterbi algorithm circuit 307a2.

Hereinafter, actual operation of the maximum likelihood decoder 307a will be explained. The replica generation circuit 307a1 generates all the possible states of the transmission symbols Sa and Sb, and then replicas of the receiving signals are generated, taking into consideration the propagation path and influence of fluctuation by the antenna interference part 306a. That is, the replica of the receiving signal is generated by multiplying Sa and Sb by the weights ra1 and ra2 and adding together.

The viterbi algorithm circuit 307a2 compares the replica generated by the replica generation circuit 307a1 with the output of the array processing interference canceller 307a during a constant period, and maximum likelihood series estimation is performed to output the transmission series of the maximum likelihoods Sa and Sb. The maximum likelihood series estimation is disclosed in "digital communication", science technology publisher, 1999 by J. G. Proakis. Because of this, a detailed explanation will be omitted. That is, the maximum likelihood decoder 307a can estimate the transmission symbols at the same time, and the maximum likelihood decoder 307b can estimate the transmission symbols Sc and Sd at the same time.

Thus, in the receiving apparatus 30 of FIG. 1, the array processing interference canceller 306 eliminates only a portion of the receiving signals which are transmitted from a plurality of transmission antennas and superposed via the channel impulse response, and the remaining signal component is separated into individual transmission signals by using the maximum likelihood decoder of the signal estimator 307.

That is, the receiving apparatus of the present embodiment receives the signals by combining spatial signal processings using the antennas and temporal signal processings using the maximum likelihood decoder. Because of this, it is possible to decrease the load of the spatial signal processings. Accordingly, although four pieces of receiving antennas were conventionally necessary, only three pieces of receiving antennas are necessary for the receiving apparatus of the present embodiment. Because of this, it is possible to downsize and simplify the receiving apparatus.

On the other hand, the receiving apparatus of the present embodiment uses the maximum likelihood decoder to separate and decode a plurality of transmission symbols. The maximum likelihood decoder can be realized by the digital circuit. The apparatus is hardly complicated by adding the maximum likelihood decoder. As compared with the advantageous effect capable of reducing hardware such as antennas, demerit is very small.

If the number of the receiving antennas is not decreased, it is possible to use spare antennas as diversity, thereby improving error rate of signals.

In the present embodiment, the example in which the transmission antennas are four pieces, the receiving antennas are three pieces, and the number of the symbols eliminated by the array processing interference canceller is two, has been explained. However, the above-mentioned numbers are one example, and the present invention is not limited to these numbers.

In the above-mentioned embodiment, as the calculation method of the weight vectors calculated by the weight generator for interference canceller 304, the method of using QR (QL) resolution has been used. The calculation method using MMSE method of calculating the weight vector for minimizing square of difference between the prescribed signal and the receiving signal is also possible. Because the MMSE method has already been known, the explanation will be omitted.

FIG. 5 is a block diagram showing a modified example of the receiving apparatus, and the transmission signals are divided into groups. The receiving apparatus of FIG. 5 has a feature in which the combination of the transmission symbols eliminated by the weight generator for interference canceller 804 and the array processing interference canceller 806 is appropriately changed according to the propagation path or the state of the transmission apparatus.

The receiving apparatus of FIG. 5 has a group classification apparatus 808 and a decoding order decision apparatus 809, in addition to the receiving apparatus 30 of FIG. 1. The group classification apparatus 808 decides combinations (groups) of the transmission symbols eliminated by the array processing interference canceller 806 based on information of the estimation result of the propagation path or external information. The decoding order decision apparatus 809 decides the decoding order between the groups. The decision of the decoding order is to decide whether the transmission symbols divided into groups are separated by using the antenna interference eliminator at precedent stage, or the transmission symbols are separated by using the separate circuit & decoding circuit at subsequent stage. An example of classification method of groups is to use correlative values of the characteristics of the channel impulse response between the transmission antennas. The correlative values of the characteristics of the propagate paths between the transmission antennas can be calculated by Hermite product of the propagate path matrix Rxx.

$$R_{xx} = H^H H = \begin{bmatrix} R_{11} & R_{12} & R_{13} & R_{14} \\ R_{21} & R_{22} & R_{23} & R_{24} \\ R_{31} & R_{32} & R_{33} & R_{34} \\ R_{41} & R_{42} & R_{43} & R_{44} \end{bmatrix} \quad (39)$$

Here, R11 is an auto correlative value of the characteristics of the channel impulse response consisted of the transmission antenna 1a and the receiving antennas 2a-2d of FIG. 2. R12 is a cross-correlation value between the characteristics of the channel impulse response consisted of the transmission antenna 1a and the receiving antennas 2a-2d, and the characteristics of the channel impulse response consisted of the transmission antenna 1b and the receiving antennas 2a-2d.

When the cross-correlation value Rij (i≠j) is equal or more than a certain threshold value, the vector from the transmission antennas to the receiving antennas come near. If the array processing interference canceller 806 is to separate the transmission symbols transmitted from the transmission antennas, the separation becomes difficult, and the lowering of the output voltage occurs and the error rate lowers.

Because of this, the receiving apparatus of the present embodiment classifies the transmission symbols transmitted from the transmission antennas with the cross-correlation value Rij which is larger than a certain threshold value. That is, the array processing interference canceller 806 precedently eliminates the group including the transmission symbols transmitted from the antenna in which the cross-correlation for the other transmission antenna is lower than the threshold value, and collectively eliminates the groups including the transmission symbols from the transmission antennas in which the cross-correlation value is higher than the threshold value, in order to separate the transmission symbols in the groups by the maximum likelihood decoder in the signal estimator 807 at subsequent stage. With regard to the separation ability of the transmission symbols, the maximum likelihood decoder is more excellent than the other decoders. Because of this, according to this method, even if the cross-correlation value between the transmission antennas is large, it is possible to prevent deterioration of the error rate.

Thus, in the receiving apparatus of FIG. 5, the array processing interference canceller 806 performs the separation between groups, and the signal estimator 807 performs the separation in the group. Because of this, even if the cross-correlation value is large, and the symbol from which separation is difficult exists, it is possible to surely improve bit error rate.

Furthermore, in the group classification apparatus 808 of FIG. 5, when the transmission symbols are classified, the transmission symbols belonging to a certain group redundantly belong to the other group. Because of this, the superposed transmission symbols appear to the outputs of a plurality of signal estimators. The receiving apparatus of the present embodiment outputs the output in which reliability is largest among a plurality of outputs as a final decoding result. Here, the reliability can be determined by using a cumulative value of metric of the selected path during the viterbi decoding, difference between the maximum likelihood point and the second likelihood point at the respective time points during the viterbi decoding, and a ratio between the maximum likelihood point and the second likelihood point during the viterbi decoding. Thus, the output in which the reliability is the largest is selected among the outputs of a plurality of signal estimator, thereby improving further error rate.

Second Embodiment

A receiving apparatus of a second embodiment has a feature in which a weight is set for each of sub-arrays consisted of a plurality of receiving antennas.

Figure 6:
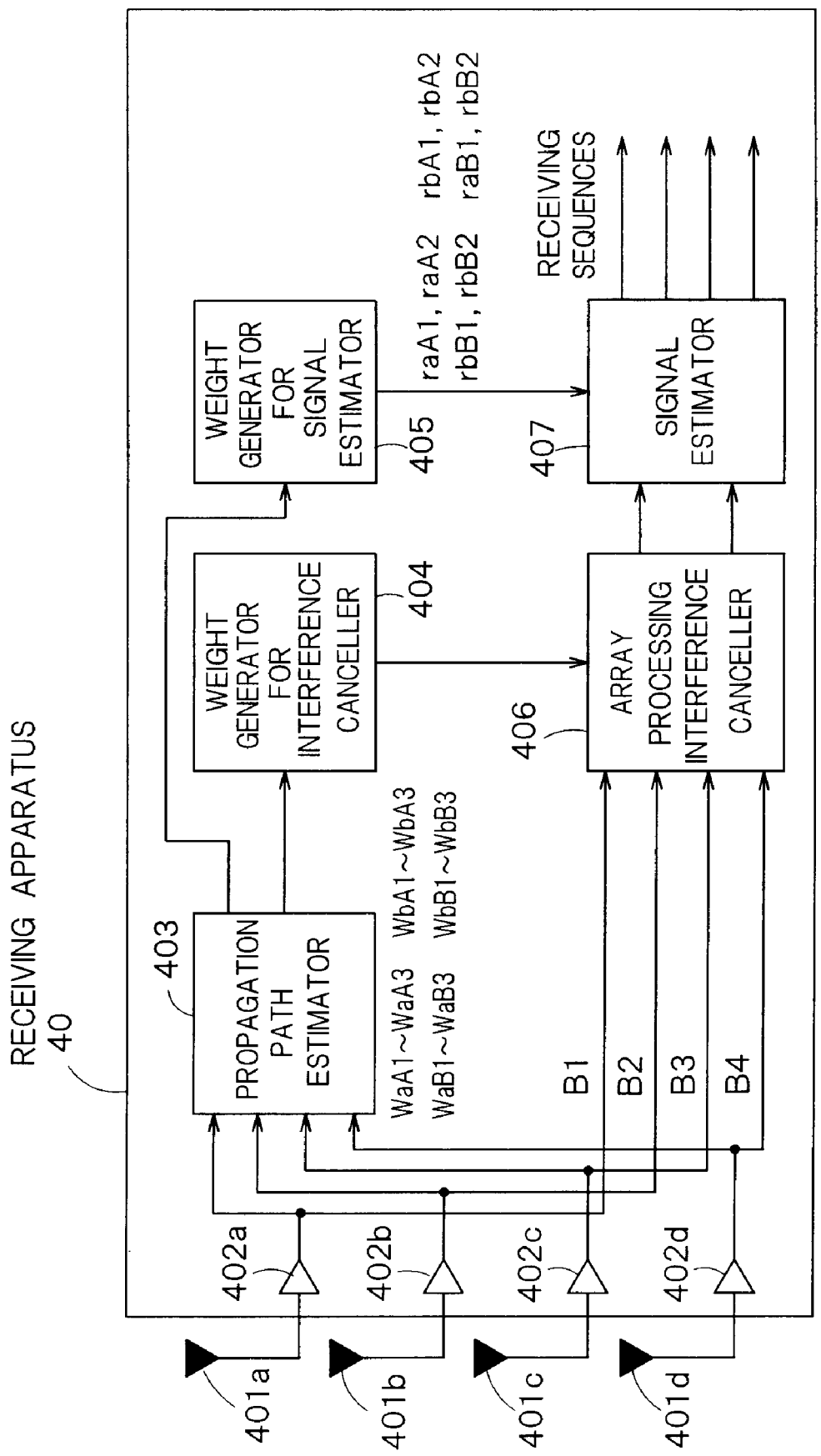
FIG. 6 is a block diagram showing schematic configuration of the recording apparatus of the second embodiment.

FIG. 6 is a block diagram showing schematic configuration of the receiving apparatus of the second embodiment according to the present embodiment. The receiving apparatus of FIG. 6 has an array processing interference canceller vector calculator 404, a weight generator for signal estimator 405, an array processing interference canceller 406, and a signal estimator 407.

Because receiving antennas 401*a*, 401*b*, 401*c* and 401*d*, wireless receiving processing parts 402*a*, 402*b*, 402*c* and 402*d* and propagation path estimator 403 have the same configurations as those of FIG. 1, the explanation will be omitted. In the present embodiment, an example having four pieces of receiving antennas will be explained. However, this is an example, and the present invention is also applicable to the other pieces of the receiving antennas.

Figure 7:
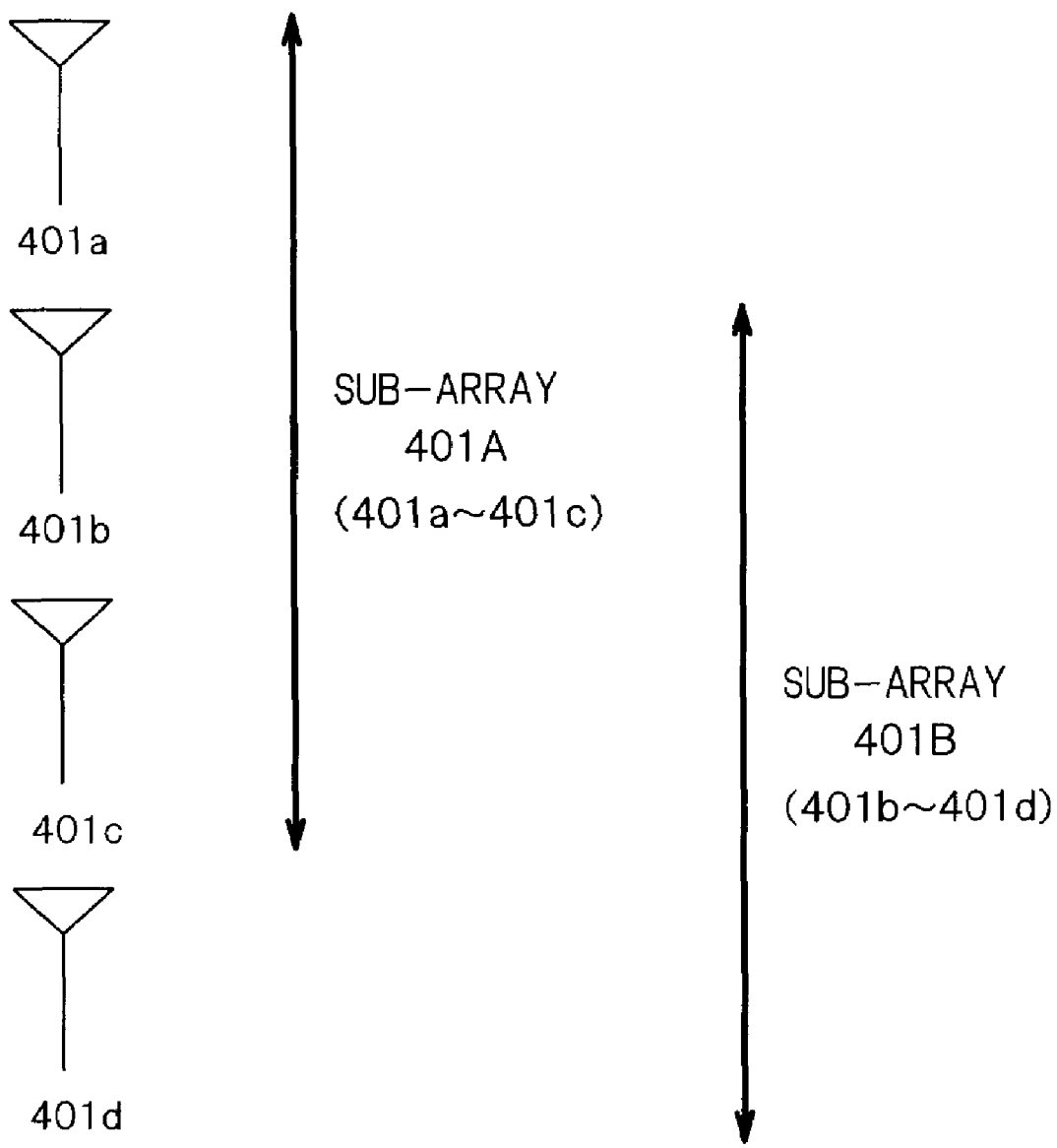
FIG. 7 is a diagram explaining sub-arrays.

Hereinafter, operation of the weight generator for interference canceller 404 will be explained. In the present embodiment, the receiving antennas are classified to a plurality of sets in order to calculate the weight vector. More specifically, as shown in FIG. 7, the receiving antennas 401*a*, 401*b* and 401*c* constitutes one set (it is called a sub-array 401A), the receiving antennas 401*b*, 401*c* and 401*d* constitutes another set (it is called a sub-array 401B). The weight vector of the array processing interference canceller vector calculator 404 is calculated for each sub-array.

The sub-array is not limited to the above configuration. For example, various sub-arrays such as configuration which does not include the same antenna element between the sub-arrays, configuration in which the number of antennas is different between the sub-arrays, and configuration consisted of a plurality of sub-arrays including all the antenna elements.

The sub-array 401A calculates a vector orthogonal to a vector consisted of the characteristics of the channel impulse response between the transmission antenna 103*c* and 103*d* and the receiving antenna in order to eliminate the transmission symbol Sc transmitted from the transmission antenna 103*c* shown in FIG. 2 and the transmission symbol Sd transmitted from the transmission antenna 103*d*.

Because the number of the receiving antennas shown in the present embodiment is four pieces, and the number of antennas of the sub-arrays is three pieces, the calculation method of the weight vector to be used for the sub-array 401A becomes equal to the method shown in the first embodiment.

The weight generator for interference canceller 404 calculates a weight vector (WaA1, WaA2, WaA3) for the sub-array 401A and a weight vector (WaB1, WaB2, WaB3) for the sub-array 401B in order to eliminate the transmission symbols Sc and Sd. The weight generator for interference canceller 404 calculates a weight vector (WbA1, WbA2, WbA3) for the sub-array 401A and a weight vector (WbB1, WbB2, WbB3) for the sub-array 401B in order to eliminate the transmission symbols Sa and Sb.

The weight generator for signal estimator 405 calculates an estimate for estimating the receiving signals by the signal estimator 407. This calculation method is performed by multiplying the weight vector corresponding to the array processing interference canceller from left side of the propagation path matrix, as explained in the first embodiment. Calculation is carried out by the same method as that of the first embodiment.

The estimation weight for the sub-arrays 401A and 401B corresponding to the transmission symbols Sa and Sb are raA1 and raA2, and raB1 and raB2, respectively. The estimation weight for the sub-arrays 401A and 401B corresponding to the transmission symbols Sa and Sb are raA3 and raA4, and raB3 and raB4, respectively.

Hereinafter, configuration of the array processing interference canceller 406 will be explained. FIG. 8 is a block diagram showing internal configuration of the array processing interference canceller 406 of FIG. 6. The array processing interference canceller 406 of FIG. 8 has an antenna interference eliminator 406*a* for eliminating the transmission symbols Sc and Sd, and an antenna interference eliminator 406*b* for eliminating the transmission symbols Sa and Sb. The antenna interference eliminator 406*a* has an antenna interference eliminator 406*a*A corresponding to the sub-array 401A and an antenna interference eliminator 406*a*B corresponding to the sub-array 401B.

Similarly, the antenna interference eliminator 406*b* has an antenna interference eliminator 406*b*A corresponding to the sub-array 401A and an antenna interference eliminator 401*b*B corresponding to the sub-array 401B. Configurations of the antenna interference eliminators 401*a*A, 401*a*B, 401*b*A and 401*b*B are the same as those of the first embodiment. Because of this, a detail explanation will be omitted.

Hereinafter, a detailed explanation of the array processing interference canceller 406 will be explained. The outputs from the receiving antennas are inputted to the antenna interference eliminator 406*a* and distributed to the antenna interference eliminators 406*a*A and 406*a*B corresponding to the sub-arrays, respectively.

In the antenna interference eliminator 406*a*A, multipliers 406*a*A1-406*a*A3 multiply the outputs of the antenna elements by the weight vector (WaA1, WaA2, WaA3). An adder 406*a*A adds together the multiplied results. Here, the weight vector (WaA1, WaA2, WaA3) is orthogonal to a vector relating to the antenna transmitting the transmission symbols (Sc, Sd) and the receiving antenna. Because of this, the output c1 of the antenna interference eliminator 406*a*A extracts signal component relating to the transmission symbols Sa and Sb.

Similarly, the output c2 of the antenna interference eliminator 406*a*B extracts signal component relating to the transmission symbols Sa and Sb. However, because the antenna element used for the antenna interference elimination part 406*a*A and the weight vector multiplied by the antenna element are different, the output signals c1 and c2 are different from each other.

Similarly, the array processing interference canceller 406*b* outputs the outputs c3 and c4 including signal component relating to the transmission symbols Sc and Sd. The outputs c1-c4 of the array processing interference canceller are inputted to the signal estimator 407.

Thus, the array processing interference canceller 406 multiplies the weight vector to the output signals of the receiving antennas belonging to sets consisted of 2 or less than (N−1) pieces of receiving antennas, adds together the multiplied results, eliminates signal component relating to I (I≦N−2 in the case where N is less than L, and I=L−2 in the case where N≧L) pieces of transmission signals from a superposition signal obtained by superposing L (2≦L≦M, M is the total number of receiving antennas) pieces of transmission signals via the channel impulse response, and outputs the superposition signals obtained by superposing signal component relating to two or more pieces of transmission signals from which signal component has not been eliminated, for the number of sets.

Figure 9:
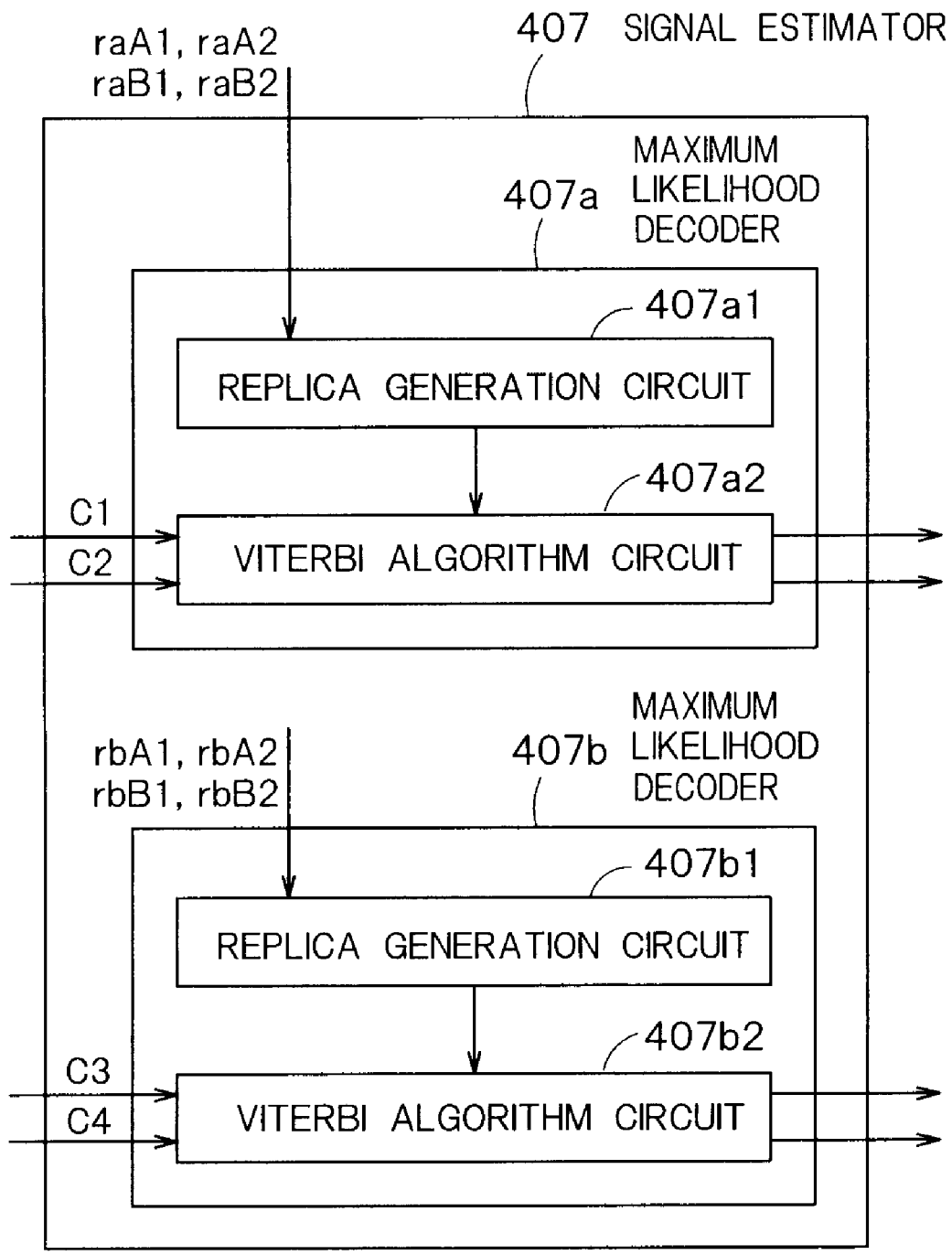
FIG. 9 is a block diagram showing internal configuration of a signal estimator in the receiving apparatus of FIG. 6.

Hereinafter, configuration of the signal estimator 407 will be explained. FIG. 9 is a block diagram showing internal configuration of the signal estimator 407 of FIG. 6. The signal estimator 407 has maximum likelihood decoders 407*a* and 407*b*. The maximum likelihood decoder 407*b* has a replica generation circuit 407*b*1 and a viterbi algorithm circuit 407*b*2. Although the signal estimator 407 of FIG. 9 is almost the same as the signal estimator 307 FIG. 4, the viterbi algorithm circuit of the signal estimator 407 has a plurality of inputs, different from that of the signal estimator 307.

Hereinafter, operation of the signal estimator 407 will be explained in detail. First of all, operation of the maximum likelihood decoder 407 a will be explained. The replica generation circuit 407*a*1 generates replicas of the receiving signals taking into consideration a fluctuation factor of the channel impulse response and influence of the array processing interference canceller with regard to all the combinations of the transmission symbols Sa and Sb.

In the receiving apparatus of the present embodiment, different from the first embodiment, the inputs of the viterbi algorithm circuit exist for the number of sub-arrays. Because of this, the replicas are generated for the number of the sub-arrays with regard to a certain combination of the receiving signals.

More specifically, a replica generated by using the weights raA1-raA3 calculated by the weight generator for signal estimator 405 and a replica using the weights raB1-raB3 are generated. Even if the number of generating the replicas increases, the number of states of combinations of the transmission symbols does not change. The amount of calculation for generating the replicas increases linearly with regard to the number of the sub-arrays.

Next, the viterbi algorithm circuits 407a2 and 407b2 performs separation and decoding of the receiving signals by using the replicas of the generated receiving signal. The viterbi algorithm outputs the combination of the transmission symbols with largest likelihood at the respective time points with regard to the transmission symbols cutting across a plurality of time points.

In the present embodiment, as the likelihoods at the respective time points in the viterbi algorithm, the likelihoods at the respective time points are calculated by using both of a likelihood function of the signal c1 corresponding to the sub-array 401A and a likelihood function of the signal c2 corresponding to the sub-array 401B (the signals c1 and c2 are called branches). Products of the likelihood functions become equal to a sum of metric calculated by the outputs c1 and c2 of the sub-arrays. Because of this, by using the signals c1 and c2, the metrics at the respective time points of the viterbi algorithm are calculated similarly to the first embodiment. The sum of the metric of the branches c1 and c2 is set to be the metric at that time. If a metric $F_j(\sigma t-1, \sigma t)$ expresses the metric for the output of jth sub-array when transiting from a state $\sigma t-1$ at time point (t−1) to a state $\sigma t$ at time point t, the metric after combination is expressed Equation (4).

$$F(\sigma_{t-1}, \sigma_t) = \sum_{j}^{J} F_j(\sigma_{t-1}, \sigma_t) \quad (4)$$

This method is called a metric combination type diversity. J is the number of sub-arrays. A method of setting a directive antenna to a diversity branch, and performing the metric combination type diversity is disclosed in "one prospect relating to application for a viterbi equalizer of directive diversity receiving" by Suzuki et al., Shingaku technical report, RCS91-13, No. 23, pp. 45-52, June 1991. In this document, the maximum likelihood decode using the metric combination type diversity is more excellent in bit error rate than the method of the maximum likelihood decode after maximum ratio combination diversity.

The array processing interference canceller 406 of the present embodiment eliminates the interference of the receiving signals by using the weight vector different from each of the sub-arrays. That is, it is assumed to have one directivity at the entire sub-arrays consisted of a plurality of antenna elements.

Thus, the receiving apparatus of the second embodiment performs the metric combination type diversity between the sub-arrays by using a plurality of sub-arrays. Because of this, it is possible to improve the bit error rate as disclosed in the above-mentioned documents.

If the sub-arrays are used, it is possible to take into consideration the fluctuation of the propagation path. Because of this, the second embodiment is especially effective in the case where the fluctuation of the channel impulse response occurs by when the weight is updated.

Third Embodiment

A third embodiment reduces the number of transmission symbols performing interference elimination. A transmission apparatus of the third embodiment has almost the same configurations as those of FIGS. 1-4. Only the internal configuration of the separate circuit & decoding circuit is different from that of FIG. 4.

Hereinafter, the configurations of the receiving apparatus of the third embodiment will be explained with reference to FIGS. 1-4. Operations of the weight generator for interference canceller 304 and the signal estimation weight calculation 305 will be explained. A method of calculating the weight vector for the antenna interference elimination part 306a is the same as that of the first embodiment. The weight for the antenna interference elimination vector calculation circuit 306b calculates a vector (h13, h23, h33), a vector with actual number times of complex conjugate of a vector (h14, h24, h34), or a weight vector (W'b1, W'b2, W'b3) of a linear sum of both vectors. It is unnecessary for the weight vector to be orthogonal to any vector.

That is, Sa, Sb, Sc and Sd are included in the output of the antenna interference eliminator 306b. The weight generator for signal estimator 305 calculates the weight for calculating an estimate of the signal appearing to the output of the array processing interference canceller 306 similarly to the first embodiment. That is, the weights (r'a1, r'a2), (r'b1, r'b2), and (r'b3, r'4) are calculated for the antenna interference eliminators 306a and 306b, respectively.

The array processing interference canceller 306 of the present embodiment is the same as that of the first embodiment. Because of this, a detail explanation will be omitted.

Figure 10:
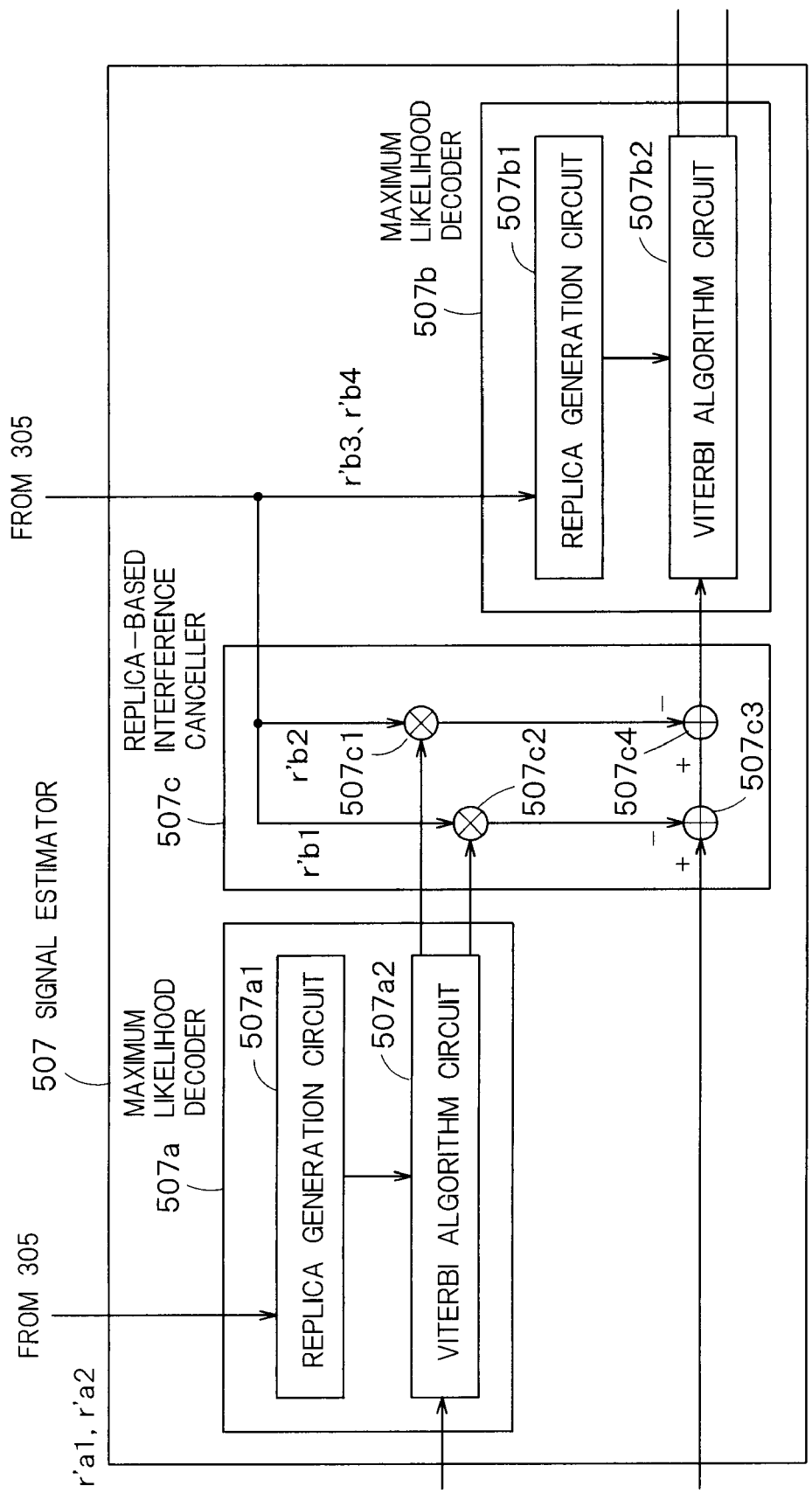
FIG. 10 is a block diagram showing internal configuration of the signal estimator of the third embodiment according to the present invention.

FIG. 10 is a block diagram showing internal configuration of the signal estimator 507 of the third embodiment. The signal estimator 507 has a maximum decoders 507a and 507b, and an interference canceller 507c.

Because operation of the maximum likelihood decoder 507a is the same as that of the first embodiment, explanation will be omitted. The transmission symbols Sa and Sb decoded by the maximum likelihood decoder 507a multiplies the transmission symbols by the weights r'b1 and r'b2 taking into consideration influence of the propagation path and the antenna interference eliminator 306b in the multipliers 507c1 and 507c2, and subtracts the multiplied results from the output fo4 the antenna interference elimination part 306b.

That is, the signal component relating to the transmission symbols Sc and Sd is included in the output of the interference cancel circuit 507c. The output of the interference cancel circuit 307c is inputted to the maximum likelihood decoder 307b, and separation and decoding of the transmission symbol are performed by using the signal estimation weights (r'b3, r'b4), similarly to the first embodiment.

Thus, according to the third embodiment, the number of the transmission symbols for performing interference elimination by the antenna interference elimination part 306b decreases. In the second embodiment, the number of the symbols for performing the interference elimination becomes zero. Because of this, as compared with the first embodiment, it is possible to enlarge degree of freedom of vector space relating to the receiving antennas. More specifically, if the receiving antennas are N pieces, and one piece of transmission signals among L pieces of transmission signal groups is eliminated, the degree of freedom remains (N−1) pieces. Because it is possible to use the remaining degree of freedom as diversity combination, it is possible to increase diversity gain. Therefore, it is possible to expect improvement of power saving and bit error rate of the transmission apparatus and the receiving apparatus. Similarly to the first embodiment, it is possible to use MMSE method as a method of calculating the vector in the interference elimination.

Fourth Embodiment

A receiving apparatus of the fourth embodiment has a feature in which it is possible to reduce the number of the transmission symbols for passing through the array processing interference canceller.

The receiving apparatus of the fourth embodiment has a different array processing interference canceller and a signal estimator with configurations different from those of the first to third embodiments. The other configurations of the receiving apparatus are the same as those of FIGS. 1-4.

Figure 11:
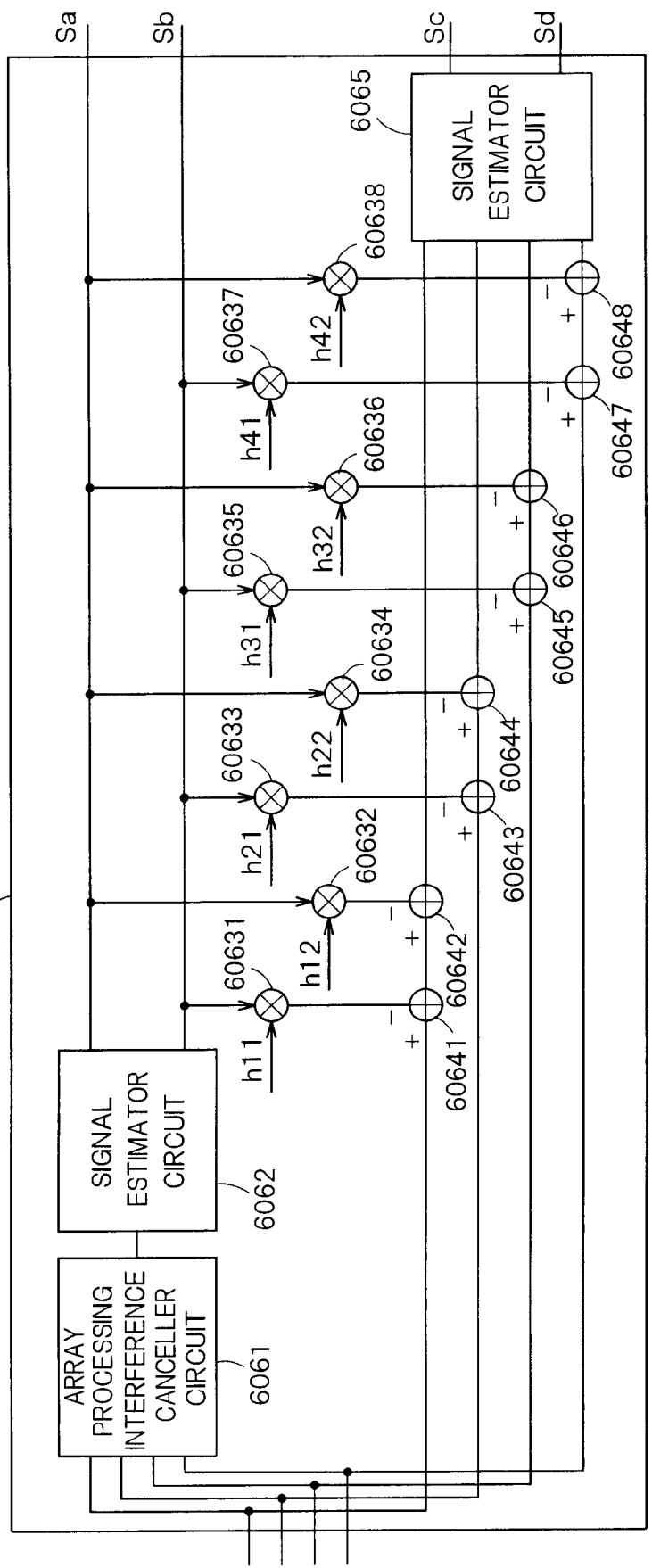
FIG. 11 is a block diagram showing internal configuration of the signal estimator of the fourth embodiment according to the present invention.

FIG. 11 is a block diagram showing internal configuration of the array processing interference canceller and the separation circuit & the decoding circuit. As shown in FIG. 11, the receiving apparatus of the fourth embodiment has an array processing interference canceller 6061, signal estimators 6062 and 6065, multipliers 60631-60638, and adders 60641-60648.

The outputs of the receiving antennas are inputted to the array processing interference canceller 6061. If the antenna interference eliminator 306a of the first embodiment is used as the configuration of the array processing interference canceller 6061, only the signal component relating to the transmission symbols Sa and Sb is included in the output signal of the array processing interference canceller 6061.

The output of the array processing interference canceller 6061 is inputted to the signal estimator 6062. If the maximum likelihood decoder 307a of the first embodiment is used as the configuration of the signal estimator 6062, the separated transmission symbols Sa and Sb are outputted from the outputs of the signal estimator 6062.

The transmission symbols Sa and Sb are outputted as an output series, and cancelled from the output of the receiving antenna.

The receiving apparatus of the present embodiment has no array processing interference canceller for eliminating the transmission symbols Sa and Sb. First of all, the multiplier 6031 multiplies the characterization factor h11 of the propagation path from the transmission antenna transmitting Sa to the receiving antennas 301 or 401 to generate the replica for Sa. After then, the replica is cancelled from the outputs of the receiving antenna 301 or 401. Similarly, the component of the transmission symbol Sb is cancelled from the outputs of the antennas corresponding to the receiving antenna 301 or 401. When cancellation from all the antennas is performed, only the signal component relating to the signal symbols Sc and Sd is included in the input of the signal estimator 6065.

Here, because the signal estimator 6065 has a plurality of inputs, the branch metric combination method explained in the second embodiment is applicable to the present embodiment. According to the second embodiment, when the transmission symbols Sc and Sd are decoded, the signals do not pass through the array processing interference canceller. Because of this, the likelihood and power of the symbols in the interference elimination does not reduce. Because of this, the error rate of the transmission symbols Sc and Sd becomes better than that of the first to third embodiments. This is effective when the error rate necessary for the transmission symbols is different. Otherwise, the output result of the signal estimator 6065 is directly cancelled from the antenna output, and it is possible to improve the error rate of the transmission signals Sa and Sb by decoding the transmission signals Sa and Sb again by the maximum likelihood decode.

The array processing interference canceller 6061 decodes the transmission symbols Sa and Sb without using the maximum series estimation only by itself, similarly to the conventional technique, and then it is possible to decode the remaining transmission symbols by cancellation method and the maximum likelihood decode used by the present embodiment.

The transmission symbols Sc and Sd of the receiving apparatus of the fourth embodiment do not pass through the array processing interference canceller 6061. Because of this, the likelihood Sc and Sd is larger than the likelihood Sa and Sb. Accordingly, the amplitude of the transmission signals in the wireless transmission processing parts 702a and 702b of the transmission part 70 becomes larger than the amplitude in the wireless transmission processings 702c and 702d, the transmission symbols Sa and Sb are classified to the same group, and the transmission symbols Sc and Sd are classified to a different group. Therefore, it is possible to constantly maintain the error rate between the transmission symbols.

Thus, according to the fourth embodiment, because a portion of the received transmission symbols does not pass through the array processing interference canceller, it is possible to reduce the coding error rate.

Fifth Embodiment

Configuration of a transmission apparatus of a fifth embodiment is different from that of the first to fourth embodiments.

FIG. 12 is a block diagram showing internal configuration of a transmission apparatus of a fifth embodiment. The transmission apparatus of FIG. 12 has coding modulators 701a-701d provided for antennas, wireless transmission processing parts 702a-702d for performing prescribed wireless transmission processings, and transmission antennas 703a-703d.

Hereinafter, operation of the transmission apparatus 70 of the fifth embodiment will be explained. The transmission series are inputted to the coding modulators 701a-701d. The outputs of the coding modulators 702a-702d are inputted to the wireless transmission processing parts 702a-702d in order to perform prescribed wireless transmission processings (such as D/A conversion or up-conversion), and then the outputs of the wireless transmission processing parts are transmitted from the transmission antennas 703a-703d.

Hereinafter, the coding modulators 701a-701d will be explained in detail. Because configurations of the coding modulators 701a-701d are almost the same, the coding modulator 701a will be firstly explained, and then the coding modulators 701b-701d will be explained in detail.

The coding modulator 701a has a serial/parallel converter 701a1, a trellis coder 701a2 and a mapping circuit 701a3, as shown in FIG. 13.

The coding modulator 701 of the present embodiment has a configuration disclosed in "Channel coding with multilevel/phase signals", by G. Ungerboeck et al. Vol. IT-28, pp. 55-67, January, 1982. The coding modulator 701 is also applicable even to "A new multilevel coding method using error correcting codes", by H. Imai et al. IEEE Transactions on information theory, Vol. IT-23, pp. 371-377, May. 1977.

The coder 701a2 is applicable to the trellis coder, a block coder and a turbo coder. The string inputted to the coding modulator 701a is converted in parallel to Pa1 and Pa2 of FIG. 13 by the serial/parallel converter 701a1.

Figure 14:
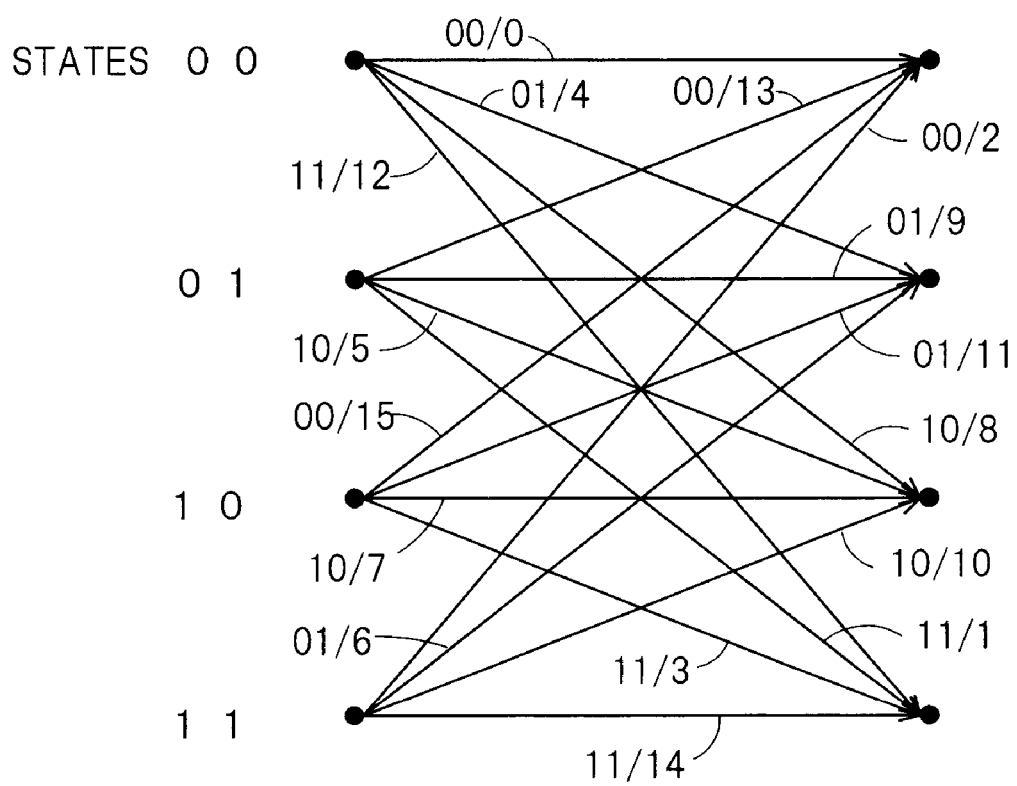
FIG. 14 is a diagram showing a trellis diagram of a trellis coder of the fifth embodiment.

The output of the serial/parallel converter 701a1 is inputted to the trellis coder 701a2. The trellis coder 701a2 decides the output series based on the trellis diagram, for example, shown in FIG. 14. The trellis coder 701a2 of FIG. 14 has four states "00, 01, 10, 11". The outputs and the states are changed by the inputs of Pa1 and Pa2.

It is assumed that the state of the trellis coder 701a2 is "00". When the inputs of Pa1 and Pa2 are zero, the output of the trellis coder 701a2 is zero and is transited to the state of "00". This is expressed "10/8". The output of the trellis coder 701a2 is four bits, and has the outputs from "0" to "15".

FIG. 15 shows a chart of an example of a coding rule in which the trellis diagrams of the trellis coders 701a2, 701b2, 701c2 and 701d2 are simplified. This chart is disclosed in "properties of trellis coding same channel interference canceller", by Kikuchi et al., Shingaku technical report, RCS2000-254, pp. 63-68, March 2001, which performs coding modulation by using different coders for a plurality of antennas.

Figure 16:
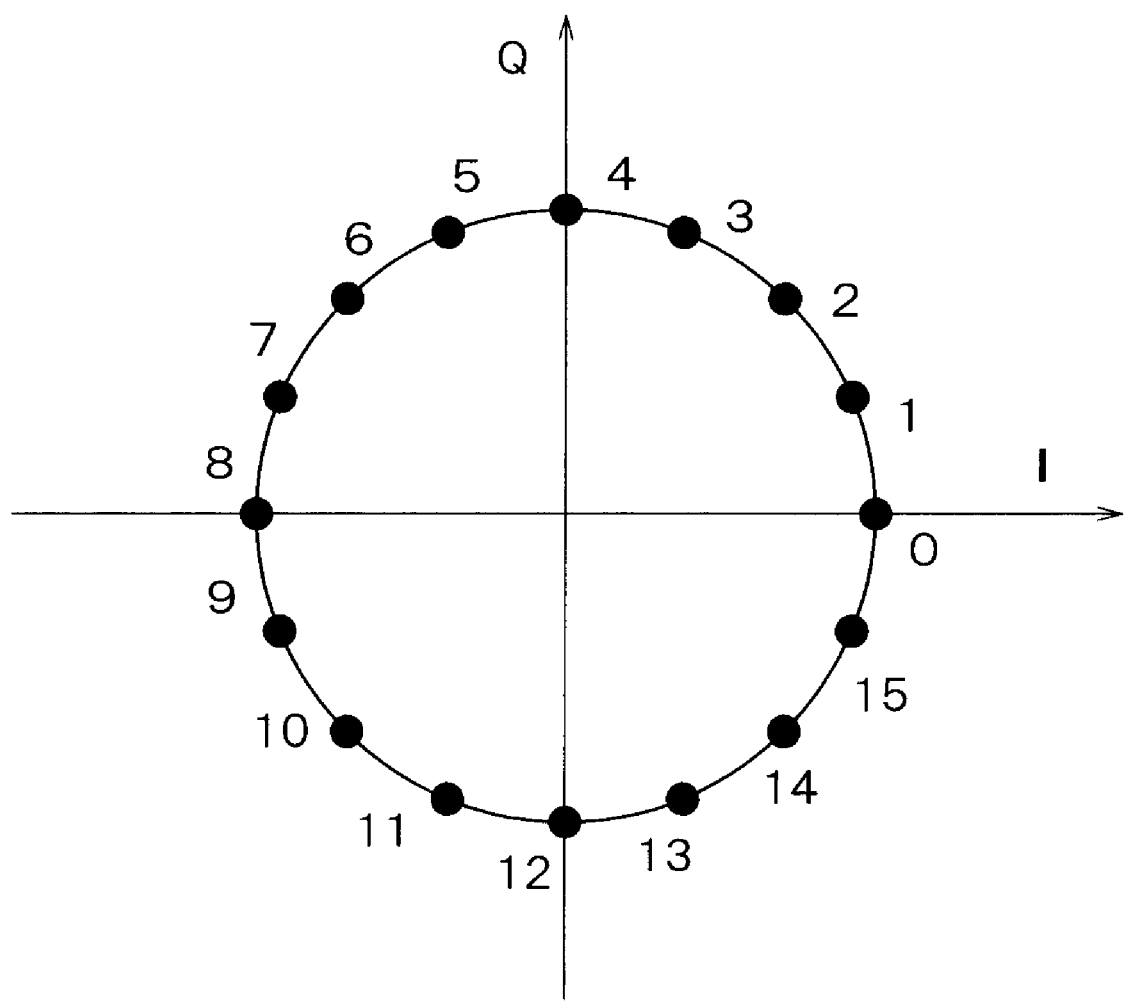
FIG. 16 is a diagram showing an example of a signal point mapping of the fifth embodiment.

Among the output of the trellis coder 701a2, one point of a complex plane shape of the mapping circuit 701a3 is selected to output a complex base band signal. FIG. 16 shows an example of a signal point mapping in the case where 16PSK is used as a modulation system. The numerals of the signal points of FIG. 16 correspond to the output of FIG. 14.

Hereinafter, the receiving apparatus of the fifth embodiment will be explained. Any of the above-mentioned first to fourth embodiments is applicable as the receiving apparatus of the fifth embodiment. Here, an example of using the receiving apparatus of the first to fourth embodiments will be explained. In the receiving apparatus 30 of the fifth embodiment, operation of the signal estimator 307 is different from that of the first to fourth embodiments.

Hereinafter, the maximum likelihood coder 307a of the signal estimator 307 will be explained in detail. In the maximum likelihood decoder 307a, the replica generation circuit 307a1 generates the replica of the receiving signal. The total number of the states in the coding modulator 701a of the present embodiment is four, and the total number of the transmission symbols separated and decoded by the maximum likelihood decoder 307a2 is two. The total number of the states of the viterbi algorithm used by the viterbi algorithm circuit 307a2 is $4^2$.

Generally, if the number of states of the transmission symbols at the respective time points is K, and the number of the transmission symbols to be separated and decoded is P, the total number of the states of the viterbi algorithm circuit used by the maximum decoder is $K^P$. Without using the coding modulator to the transmission apparatus, and without using the antenna interference elimination apparatus such as the first embodiment as the receiving apparatus, it is assumed that the maximum likelihood decode is performed for all the transmission symbol. At this time, $K=2^Q$, $P=L$, and the total number of the states at viterbi algorithm becomes $2^{Q\times L}$. Here, Q is the number of many-valued modulation.

That is, as the number of the many-valued modulation and the number of transmission symbols increase, the number of states of the viterbi algorithm rises exponentially. However, by using the first embodiment, and by eliminating $L-1$ ($l\geq 2$) pieces of transmission symbols among L pieces of transmission symbols by the array processing interference canceller, $K=2^Q$ and $P=1$ are obtained. Thus, it is possible to reduce P, and to reduce the number of states of the viterbi algorithm to be $2^{Q\times l}$.

In the above-mentioned document of Kikuchi, the number of states of the transmission symbols is limited by using the coding modulator as the transmission apparatus. When the number of the states of the transmission symbols at the limited time points is k, $K=k$ ($k\leq 2^Q$) and $P=L$ is obtained. Therefore, it is possible to reduce k, and to reduce the number of states of the viterbi algorithm to be $k^l$. However, by using the fifth embodiment in addition to the technique of Kikuchi, it is possible to reduce both of K and P. Because of K=k and P=l, it is possible to reduce the number of states to be $k^l$. Therefore, it is possible to realize the minimum number of the states among all the above embodiments.

When the coding modulation is used for the transmission apparatus, transmission speed lowers depending on the coding rate. Conversely, the error rate is improved depending on code gain. Because of this, if the error rate is constant, it is possible to improve the transmission speed by lowering the coding rate of communication path coding apparatus located at preceding stage of the transmission apparatus 40.

Signal point arrangement of the coding modulator of the transmission apparatus according to the present invention is the same in all the antennas. However, even if the modulation system is the same, it is possible to use the signal point arrangement for each antenna.

For example, when the receiving apparatus having configurations of FIG. 5 is used, it is possible to classify the transmission symbols transmitted from the transmission antennas in which cross-correlation factor Rij of the characterization factor of the propagation path between the antennas is higher than the threshold value, and the transmission symbol transmitted from the transmission antennas in which characterization factor is lower than the threshold value.

Now, it is assumed that the cross-correlation value of the transmission symbols Sa and Sb is large, and the cross-correlation value of the transmission symbols Sc and Sd is lower than that of the other transmission symbols. In this case, the group classification apparatus classifies the transmission symbols Sa and Sb as one group, the transmission symbol Sc as another group, and the transmission symbol Sd as another group. That is, the group classification apparatus classifies into three groups in total.

At this time, the array processing interference canceller 306 performs separation between groups. That is, three types of a signal in which the transmission symbols Sa and Sb are superposed, a signal of the transmission symbol Sc, and a signal of the transmission symbol Sd appear to the outputs of the array processing interference canceller 306.

The superposed signal is inputted to the signal estimator, and separation & decode is performed in order to separate the transmission symbol Sa and Sb from the signal in which the transmission symbols Sa and Sb are superposed.

That is, the array processing interference canceller can easily separate the symbols in which the cross-correlation value for the other transmission symbols is relatively small, without coding modulation. On the other hand, it is difficult to separate the transmission symbols in which the cross-correlation value for the other transmission symbols is high. Because of this, the error rate is prevented by performing the coding modulation.

Thus, coding processings are performed for only the transmission symbol from the antennas in which separation is difficult, and the coding processings are not performed for the transmission symbols from the antennas in which separation is easy. It is possible to improve the capacity of transmission in the entire wireless communication system.

According to the fifth embodiment, the coding modulation having coding gain of coding rate lower than that of the other transmission symbols is performed for sets of the transmission symbols in which the cross-correlation value Rij from the transmission antennas can be maintained lower than the threshold value. Because of this, it is possible to classify the transmission symbols with different coding rates, to separate group, respectively. It is possible to improve capacity of transmission of the wireless communication system by using this method.

The transmission apparatus 70 of the fifth embodiment performs the coding modulation using the coder different from each transmission antenna. Because of this, the trellis coder is used for sets of the transmission symbols which can maintain the cross-correlation value Rij from the transmission antenna to be low, and the turbo coder is used for sets of the transmission symbols in which the cross-correlation value is larger than the threshold value. Furthermore, the transmission symbol coded by using the different coder is classified to the groups different from each other. It is possible to improve the error rate of the symbols transmitted from the transmission antenna with high cross-correlation value.

The transmission apparatus 70 of the fifth embodiment transmits the transmission symbol modulated by the modulation systems different from each transmission antenna. The modulation using 64QAM system for the transmission symbols Sa and Sb are performed, and the modulation using QPSK system for the transmission symbols Sc and Sd are performed. When the maximum likelihood decode is used for the transmission symbols Sa and Sb, the number of states in the viterbi decoding increases much.

On the other hand, in the array processing interference canceller 306, the amount of calculation does not depend on the modulation system for separation. Accordingly, the transmission symbols Sa and Sb are classified to one group, and the transmission symbols Sc and Sd are classified to another group. That is, the array processing interference canceller 306 classifies the transmission symbols to three groups in total.

First of all, the array processing interference canceller 306 performs separation between groups. That is, the outputs of the array processing interference canceller 306 includes three types of signals including individually separated Sa and Sb, and the signal in which Sc and Sd are superposed. The superposed signals are inputted to the signal estimator 307 in order to separate Sc and Sd.

Thus, by changing how to use the maximum likelihood decoder in the array processing interference canceller 306 and the signal estimator 307 by the number of many-valued modulation, it is possible to improve transmission efficiency in the limited number of the antenna elements and the processing capability of hardware.

Similarly to the number of many-valued modulation, the transmission antennas 301a, 301b and 301c transmit the transmission symbols by the transmission systems different from each other such as OFDM system or CDMA system. The transmission symbols of different communication systems are classified to the groups different from each other in order to perform decoding by the methods of the first to sixth embodiments.

Furthermore, in the transmission apparatus 70 of FIG. 12, it is possible to share the coding modulator between the transmission antennas. That is, it is possible to further improve the error rate by providing redundancy between a plurality of transmission antennas, and by obtaining both of the coding gain on time axis and the coding gain between the antennas. Otherwise, it is possible to perform the transmission diversity between a plurality of transmission antennas.

Although the transmission apparatus of FIG. 12 transmits individual information symbols from one antenna, individual information symbols can be divided into a plurality of streams, different phases and amplitudes can be multiplied, and the multiplied results can be transmitted from a plurality of antennas. That is, individual information symbols are transmitted from sets of the weight vectors of a plurality of antennas at transmission side. By using this method, it is possible to finely set the amplitude and phase of the received individual information symbols. Therefore, for example, it is possible to improve consumption power of the transmitter and the bit error rate of the receiving apparatus.

Thus, according to the fifth embodiment, the transmission signals in which coding with different coding gains is performed are transmitted from the transmission apparatus. Because of this, it is possible to easily separate and decode the transmission symbols in the receiving apparatus.

In the above-mentioned embodiment, an example in which the narrow band propagation path such as BLAST is presumed, and delay wave in the receiving signal can be ignored has been explained. However, the present invention is applicable to the case where the delay wave exists in wide band propagation path. In the wide band propagation path, the frequency response of the characteristics of the channel impulse response is not flat. Because of this, the number of states in the maximum likelihood decoder increases. Because of this, if an algorithm disclosed in "Delayed decision-feedback sequence estimation", by Duel-Hallen et al., IEEE Transactions on Communication, Vol., 37-5, pp. 428-436, May 1989, is used, it is possible to reduce the number of states.

When the receiving powers for transmission symbols measured at receiving side are different from each other, properties change largely in accordance with order of the decoded transmission symbols. With regard to sequence of decoding of the transmission symbols at this time, all the methods researched by the BLAST and so on are applicable.

Even in the present embodiment, because the cancellation circuit used by the BLAST is used, the higher the likelihood of the transmission symbols decoded on ahead is, the higher the likelihood of the subsequently decoded transmission symbols becomes. Because of this, with regard to the precedently decoded transmission symbols, the array processing interference canceller does not eliminate the other symbols so much, but the maximum likelihood decoder performs separation from the other symbols. Therefore, if the likelihood of the precedently decoded symbols is raised, the maximum likelihood decoder is unnecessary for the subsequently decoded transmission symbols, or it is possible to restrict deterioration of error rate, despite of reduction of processings.

The invention claimed is:

1. A receiving apparatus, comprising:

N (N≧3) pieces of receiving antennas;

a channel impulse response estimator which estimates characteristics of channel impulse response of said N pieces of receiving antennas, based on L (2≦L) pieces of transmission signals transmitted from said L pieces of transmission signals among M (2≦L≦M) pieces of transmission antennas;

a weight generator for an interference canceller which calculates weight vectors to be multiplied by output signals of sets consisting of two or more and less than N pieces of receiving antennas among said N pieces of receiving antennas, based on estimates of the characteristics of said channel impulse response;

an array processing interference canceller which eliminates signal components relating to $0 \leq I$ wherein $I \leq N-2$ in the case where said N is less than said L, and $I=L-2$ in the case where said N is not less than said L pieces of transmission signals from superposition signals obtained by superposing said L pieces of transmission signals via each propagation path, and outputs the superposition signals obtained by superposing signal components relating to two or more transmission signals from which signal components have not been eliminated, for the number of said sets, by multiplying the output signals of the receiving antennas belonging to said sets by said weight vectors, and adding together the multiplied results;

a weight generator for a signal estimator which calculates weights to be used to calculate estimates of the receiving signal included in the output of said array processing interference canceller; and a signal estimation unit configured to separate and decode individual transmission signals from the output signals of said array processing interference canceller, by using the weights calculated by said weight generator for a signal estimator; and a transmission signal classification unit configured to classify said L pieces of transmission signals into more than one group each including one or more transmission signals, wherein said array processing interference canceller eliminates only the signal component relating to a transmission signal component which does not belong to said group; and the signal estimation unit selects the most reliable output among the transmission signals separated and decoded with respect to the more than two groups when one transmission signal is classified into more than two groups as the decoded result.

2. The receiving apparatus according to claim 1, wherein said signal estimation unit has a maximum likelihood series estimator which separates the receiving signal based on the result of maximum likelihood series estimation by using likelihood calculated by two or more superposition signals obtained for the number of said sets by said array processing interference canceller.

3. The receiving apparatus according to claim 1, wherein said signal estimation unit separates and decodes the transmission signals by subtracting duplicated signals of the transmission signals from all the transmission signals except for K ($K \geq 1$) pieces of transmission signals, wherein the duplicated transmission signals are obtained by superposing again the characteristics of the propagation path with regard to the K pieces of transmission signals decoded from the superposition signal obtained by superposing via said propagation path.

4. The receiving apparatus according to claim 1, further comprising:

a decoding order decision apparatus which decides the decoding order of said more than one group, wherein said array processing interference canceller eliminates only the signal component relating to transmission signal component which does not belong to said group, based on the decoding order decided by said decoding order decision apparatus;

wherein said signal estimation unit separates and decodes the transmission signals in the group; and wherein said transmission signal classification unit classifies into one group the transmission signals from sets of the transmission antennas in which cross-correlation value of the vector is larger than a threshold value, and classifies into another group the transmission signals in which a cross-correlation value of the vector is smaller than said threshold value, wherein L pieces of vectors are factors of the channel impulse response between said L pieces of transmission antennas and said N pieces of receiving antennas.

* * * * *